United States Patent [19]

Kobayashi et al.

[11] Patent Number: 4,874,530
[45] Date of Patent: Oct. 17, 1989

[54] METHOD FOR TREATING PHOTOGRAPHIC PROCESSING WASTE SOLUTION

[75] Inventors: Kazuhiro Kobayashi; Masayuki Kurematsu; Shigeharu Koboshi; Nobutaka Goto; Naoki Takabayashi, all of Hino, Japan

[73] Assignee: KNICA Corporation, Tokyo, Japan

[21] Appl. No.: 126,408

[22] Filed: Nov. 27, 1987

[30] Foreign Application Priority Data

| Dec. 5, 1986 | [JP] | Japan | 61-291137 |
| Dec. 8, 1986 | [JP] | Japan | 61-291944 |
| Dec. 10, 1986 | [JP] | Japan | 61-293798 |
| Dec. 10, 1986 | [JP] | Japan | 61-293799 |
| Dec. 10, 1986 | [JP] | Japan | 61-293800 |

[51] Int. Cl.$^4$ ............................ C02F 1/62
[52] U.S. Cl. ............................ 210/718; 210/719; 210/721; 210/725; 210/727; 210/737; 210/750; 210/763; 210/766; 210/908; 210/912; 210/916
[58] Field of Search ............... 210/719, 721, 724, 726, 210/757, 911, 912, 908, 916, 917, 716, 718, 725, 727, 728, 729, 732–736, 737, 750, 752, 754–756, 758–763, 765, 766, 774; 423/230, 231, 239, 244, 245

[56] References Cited

U.S. PATENT DOCUMENTS

| 3,773,662 | 11/1973 | Urban | 210/719 |
| 4,135,976 | 1/1979 | Kitajima | 210/758 X |
| 4,385,996 | 5/1983 | McCarthy | 210/719 |
| 4,530,768 | 7/1985 | Tanihara et al. | 210/719 |
| 4,666,610 | 5/1987 | Kuhns | 210/916 X |
| 4,740,244 | 4/1988 | Williams | 210/719 X |

FOREIGN PATENT DOCUMENTS

| 70841 | 5/1985 | Japan |
| 118346 | 5/1987 | Japan |
| 118347 | 5/1987 | Japan |
| 118348 | 5/1987 | Japan |
| 287244 | 12/1987 | Japan |
| 19655 | 1/1988 | Japan |
| 19656 | 1/1988 | Japan |

Primary Examiner—Tom Wyse
Attorney, Agent, or Firm—Frishauf, Holtz, Goodman & Woodward

[57] ABSTRACT

Disclosed is a method for treating a photographic processing waste solution comprising concentrating the photographic processing waste solution containing at least thiosulfate ions, characterized in that there is provided at least one part selected from (i) to (v) shown below:

(i) a part for adding sulfite ions or a compound capable of releasing sulfite ions into the photographic processing waste solution at the time or before heating of the photographic processing waste solution;
(ii) a part for contact evaporated gas with a catalyst having a metal of the following (a) to (d) or a compound thereof carried thereon:
(a) at least one selected from the group VIII elements consisting of iron, cobalt, nickel, ruthenium, rhodium, palladium, osmium, iridium and platinum,
(b) copper,
(c) zinc,
(d) manganese;
(iii) a part for permitting a water-soluble polymer to exist;
(iv) a part for permitting an oxidizing agent capable of oxidizing thiosulfate ions to exist; and
(v) a part for adding a pH controlling agent into the photographic processing waste solution in order to maintain pH of the photographic processing waste solution at 3.0 to 11.0.

21 Claims, 5 Drawing Sheets

FIG. I

METHOD FOR TREATING PHOTOGRAPHIC PROCESSING WASTE SOLUTION

BACKGROUND OF THE INVENTION

This invention relates to a method for heating and evaporation treatment of a waste solution produced by accompaniment with developing processing of a light-sensitive photographic material by an automatic processing machine for photography (in the present specification, abbreviated as photographic processing waste solution or waste solution) and a device therefor, particularly to a method adequate for inhibiting effectively bad odor and a device therefor.

In recent years, as the photographic processing by means of the so-called non-water washing automatic processing machine, which performs substantially no water washing by reduction of replenished amount or stabilizing processing substituting for washing, has been widely spread, the amount of waste solution has been reduced to a great extent.

However, also by such photographic processing of such low replenishing or non-water washing system, even in a relatively small scale processing, for example, in processing of X-ray light-sensitive material, about 10 l of waste solution are produced, and about 30 l per day in processing of light-sensitive materials for printing plates and about 50 l per day in processing of color light-sensitive materials, and treatment of such waste solution causes a problem.

The present inventors have found that the evaporation method is excellent for efficient treatment of a photographic processing waste solution of high concentration (e.g. BOD: 20,000 to 30,000 ppm, $NH_4^+$: about 20,000 to 40,000 ppm) with a small amount and have made various proposals (see Japanese patent application Nos. 259006/1985 (Publication No. 118346/1987); No. 259008/1985 (Publication No. 118347/1987); No. 259009/1985 (Publication No. 118348/1987); No. 132098/1986 (Publication No. 287244/1987); No. 165099/1986 (Publication No. 19655/1988); and No. 165100/1986 (Publication No. 19656/1988).

However, in the heating and evaporation method, there is a problem that bad odor based on sulfurous acid gas, hydrogen sulfide gas, sulfur cas, ammonia gas, amine gas, etc. is generated from the evaporated gas or the distillate, etc., and no completed process could be established unless this problem was solved.

In the prior art, as the countermeasure against such bad odor, Japanese Unexamined Utility Model Publication No. 70841/1985 proposes a method in which an adsorption treatment portion is provided at the discharging pipe portion.

However, this method is based on the same technical thought as in the discharging gas treatment known in the art in that the bad odor gas discharged is treated by adsorption at the terminal end (immediately before discharged out of the system, hereinafter the same), and it was not adequate as the gas treatment equipment to be added to the small scale waste solution treatment equipment as in the present invention.

More specifically, bad odor gas may be generally (although different depending on the components) considered to be treated by an equipment of adsorption, etc. if the problem of condensation can be solved, but the bad odor gas concentration in the waste gas obtained by evaporation of the photographic waste solution is extremely high, and when the odor gas of such high concentration is attempted to be treated by adsorption, the adsorbent will be soon saturated, whereby running cost may become enormous and also the exchange work of the adsorption is required to be performed frequently, thus being disadvantageously cumbersome. Further, if the exchange work is attempted to be made less frequent, the size of the adsorption tower is required to be made greater, whereby increase of the installation cost will be disadvantageously brought about.

On the other hand, the techniques of irradiating the evaporated gas with UV-ray or applying ozone oxidation treatment on the distillate have been known, but these techniques involve the drawbacks of high installation cost and cumbersome maintenance.

SUMMARY OF THE INVENTION

The present invention is intended primarily to solve the drawbacks of the prior art and provide a method for inhibiting efficiently bad odor without bringing about cost increase and requiring cumbersome working and a device therefor, and other objects of the present invention will be apparent from the following description in the present specification.

The present inventors have studied intensively in order to achieve the above objects, and consequently accomplished the present invention.

More specifically, the method for treating a photographic processing waste solution according to the present invention is a method for treating a photographic processing waste solution comprising concentrating the photographic processing waste solution containing at least thiosulfate ions by evaporating, characterized in that there is provided at least one means selected from (i) to (v) shown below:

(i) a means for adding sulfite ions or a compound capable of releasing sulfite ions into the photographic processing waste solution at the time or before heating of the photographic processing waste solution;

(ii) a means for contacting evaporated gas with a catalyst having a metal of the following (a) to (d) or a compound thereof carried thereon:

(a) at least one selected from the group VIII elements consisting of iron, cobalt, nickel, ruthenium, rhodium, palladium, osmium, iridium and platinum, (b) copper, (c) zinc, (d) manganese;

(iii) a means for permitting a water-soluble polymer to exist;

(iv) a means for permitting an oxidizing agent capable of oxidizing thiosulfate ions to exist; and (v) a means for adding a pH controlling agent into the photographic processing waste solution in order to maintain pH of the photographic processing waste solution at 3.0 to 11.0

Also, the device for treating a photographic processing waste solution according to the present invention has a means for feeding a photographic processing waste solution containing at least thiosulfate ions, an evaporation tank for receiving said waste solution and a heating means for heating the waste solution in said evaporation tank, thereby concentrating said waste solution by evaporation, characterized in that it has at least one of the means of the above (i) to (v).

DESCRIPTION OF THE PREFERRED EMBODIMENTS

Figure 1:
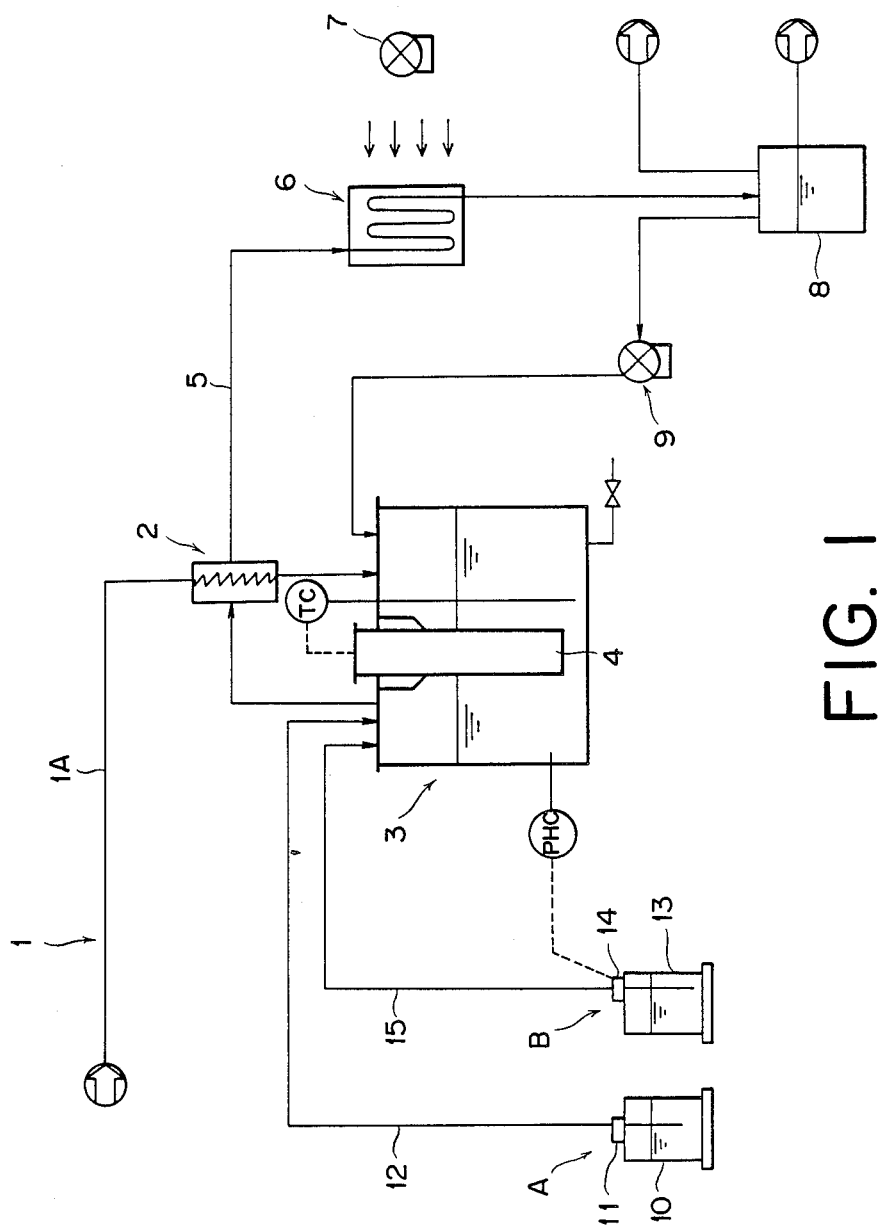
FIG. 1 through FIG. 5 are each conceptional view showing an example of the method for inhibiting bad odor according to the present invention.

The present invention is a technical thought based on the idea which is entirely contrary to the technical thought to treat bad odor gas discharged at the terminal end as in the prior art, and provides a means to countermeasure against bad odor which has not been substantially attempted in the prior art by calling attention on the generating source of bad odor.

More specifically, photographic processing waste solution contains a large amount of salts such as thiosulfate salts (e.g. ammonium thiosulfate), or sulfite salts (e.g. ammonium sulfite), etc., and these salts are decomposed as the waste solution is heated to become higher in temperature, whereby bad odor component such as $H_2S$, $SO_2$, S, $NH_3$, amine, etc. are generated.

The embodiment (i) of the present invention was further accomplished on the basis of the knowledges as described below.

That is, when the photographic processing waste solution contains amines or ammonium salts, amine or ammonia odor is generated, while when thiosulfate ions are contained in the waste solution, they are decomposed by heating at high temperature, whereby $H_2S$ gas is generated, until it is sulfurized to generate sulfur (S) gas, thus generating bad odor.

The present inventors have studied further intensively in order to inhibit bad odor as described above, and consequently found that there is amine odor or ammonia odor or no such odor depending on the kind, the composition of the waste solution, and further investigated to find that amine odor and ammonia odor are greatly reduced in the case of a waste solution where sulfite ions exist. Also, it has been found that when thiosulfate ions further exist in the waste solution, or in the case of waste solution where sulfite ions exist, generation of hydrogen sulfide or sulfur gas is greatly reduced.

The embodiment (i) of the present invention has been accomplished based on such knowledges, and by presence of sulfite ions during heating, amine odor and ammonia odor of the distillate can be inhibited, and generation of $H_2S$ or S gas can be prevented.

The reason why amine odor or ammonia odor can be inhibited may be estimated to be due to agglomeration of amine or ammonia together with sulfurous acid by steam trapping, and also the reason why generation of $H_2S$ or S gas can be prevented may be estimated to be due to prevention of decomposition reaction of thiosulfate ions which occurs by heating by sulfite ions. Next, the embodiment (ii) of the present invention is briefly described.

When a photographic processing waste solution is attempted to be treated by evaporation, ammonia is abundantly generated, and ammonia odor is excessive particularly in the region with high pH, and its bad odor is marked when thiosulfate ions ($S_2O_3^{2-}$) exist in the waste solution. Although various attempts have been made for removal of this ammonia odor, there has been no example in which use of a catalyst has been attempted.

Catalysts have been generally used in various reaction devices, but they are not so positively employed in deodorizing equipment. Particularly, against gases such as $SO_2$ gas, $H_2S$ gas, they are not frequently used. This is because $SO_2$ or $H_2S$ will lower catalytic activity, namely acts as catalyst poison.

Whereas, in the photographic processing waste solution to be treated in the present invention, thiosulfate ions (e.g. ammonium thiosulfate) or sulfite ions (e.g. ammonium sulfite), etc. are contained, and formation of $H_2S$ and $SO_2$ gas is expected in the heating process. For this reason, in the prior art, there has been seen no example in which a catalyst is used for the gas treatment in the evaporation treatment of the photographic processing waste solution of this kind.

The present inventors attempted to utilize a catalyst in the evaporation treatment of a photographic processing waste solution which has not been attempted in the prior art, and found unexpectedly that it has little catalyst poison by $SO_2$ or $H_2S$ and can effectively decompose and inhibit bad odor gases.

The present inventors have further studied based on the knowledges as described above, and consequently found that no catalyst poison is received and ammonia odor can be effectively eliminated only when a specific catalyst is used, to accomplish the embodiment (ii) of the present invention.

Next, the embodiment (iii) of the present invention is briefly described.

The present inventors have further studied from another standpoint in order to inhibit bad odor as described above, and consequently found that the amine odor and ammonia odor of the distillate can be inhibited and also generation of $H_2S$ or S gas can be inhibited if a water-soluble polymer of the present invention is present during heating.

Next, the embodiment (iv) of the present invention is briefly described.

The present inventors have studied intensively in order to solve the problems of such bad odor, etc., and consequently found that amine or ammonia odor can be alleviated to inhibit bad odor accompanied with $H_2S$, $SO_2$, S gas or other mercapto type gases and also the problem of turbidity accompanied with S, etc. can be solved by carrying out heating and evaporation in the presence of an oxidizing agent of the present invention.

This cause is not distinct, but it may abe estimated that presence of an oxidizing agent of the present invention in the heated waste solution will oxidize volatile reducing components in the waste solution to stabilize such components. For example, thiosulfate ions are oxidized to form stable species such as $SO_4^{2-}$, whereby not only $H_2S$, $SO_2$, S gas or other mercapto type gas is not generated, but such species will react with ammonia or amine to form salts to be stabilized and therefore inhibition of ammonia or amine is rendered possible. The embodiment (iv) of the present invention has been accomplished on such finding.

Next, the embodiment (v) of the present invention is briefly described.

It has been known in the art that there is generally possibility that the acidic components ($H_2S$, $SO_2$, S, etc.) are released into the air as the pH of the waste solution is lowered (e.g. lowering from pH 7 to pH 4), while the basic components ($NH_3$, amine, etc.) are released into the air by increase of the pH (e.g. increase from pH 7 to pH 10).

However, according to the studies by the present inventors, it has been found that although acidic components of bad odor gases are released by the change, particularly lowering in pH in the evaporation process, the amount of the bad odor gas components can be greatly suppressed if the pH of the concentrate is maintained at a certain range and also no bad odor is formed even if the gas components which can be bad odor may be flowed into the gas. The reason why no bad odor is formed by flowing out of these components may be estimated as follows. That is, the acidic components of the bad odor gas components discharged by change, particularly lowering in pH are migrated toward the distillate side after gas cooling, and balanced with the basic components simultaneously discharged in said distillate to undergo some chemical reactions to form, for examples, salts such as ammonium sulfite, etc., whereby no bad odor is sensible from the distillate.

The present inventors have made further studies based on the knowledge as described above, and consequently found that releasing of bad odor gas components can be inhibited or no bad odor is sensible even if the bad odor gas components may be slightly released, provided that the waste solution (concentrate) is at a certain pH range. More specifically, inhibition of bad odor becomes possible by maintaining the pH of the concentrate at 3.0 to 11.0, preferably 4.0 to 8.0, more preferably 5.0 to 7.0.

Also, the present inventors have found that when silver ions are particularly present in the waste solution, generation of minute amount of hydrogen sulfide which is particularly a harmful gas can be completely inhibited commonly in the embodiments (i) to (v) of the present invention.

Referring now to the accompanying drawing, an example in the case of the method for inhibiting bad odor according to the embodiment (i) of the present invention is to be described.

FIG. 1 is a conceptional view showing one example of the method for inhibiting bad odor.

In this figure, 1 is a means for feeding a photographic processing waste solution, 1A is a waste solution feeding pipe to be used for said feeding means 1, 2 is a preheater for preheating the photographic processing waste solution before heating, 3 is an evaporation tank, 4 is a heating means such as a heater, 5 is a vapor discharging pipe for discharging the vapor generated when the waste solution in the evaporation tank 3 is heated out of the evaporation tank 3, 6 is a gas cooler for cooling said vapor, 7 is a fan for a gas cooler, 8 is a distillate tank for storing the distillate obtained by cooling of said vapor, 9 is a circulating fan for returning the dehumidified gas to the evaporation tank, A is a means for feeding sulfite ions and a compound capable of releasing sulfite ions to the photographic processing waste solution, comprising a sulfite containing compound tank 10, a sulfite containing compound pump 11, a sulfite containing compound feeding pipe 12, etc. B is a means for feeding a pH controlling agent to the photographic processing waste solution, comprising, for example, a pH controlling agent tank 13, a pH controlling agent pump 14, a pH controlling agent feeding pipe 15 and a pH controller pHC, etc. TC is a temperature controller.

To describe about the outline of the process for evaporation and concentration treatment by use of the device as described above, the waste solution is fed through the waste solution feeding pipe 1A to the evaporation tank 3 and evaporated and concentrated by the heater 4. The evaporation and concentration are performed in the presence of sulfite ions and a compound capable of releasing sulfite ions. Also, the evaporation and concentration should be preferably performed under the state where the pH of the photographic processing solution is maintained at 3.0 to 11.0, more preferably 4.0 to 8.0, particularly preferably 5.0 to 7.0. The heating temperature is suitably controlled by the temperature controller TC.

The vapor is subjected to heat exchange with the waste solution in the preheater 2, delivered to the gas cooler 6 to be cooled and controlled in humidity, and the distillate is separated. The distillate is stored in the distillate tank 8, and since it has no sensible bad odor and satisfies the discharging water regulation values such as BOD, COD, SS, etc., it can be discharged into the rivers, etc. or reutilized, if desired. The gas from which the distillate is separated has no sensible bad odor and also contains no component which causes a problem, and therefore can be discharged out of the system.

On the other hand, the waste water in the evaporation tank is reduced in volume with lapse of evaporation and concentration time to be concentrated. The heater 4 for heating is stopped by, for example, actuation of a timer to complete heating. The residual concentrate is discharged out of the system.

Next, the method for inhibiting bad odor which is an example of the present embodiment is to be described in detail.

Among the photographic processing waste solutions, color developing solution, bleach-fixing solution contain sulfite ions, but in the case of a bleaching solution, no sulfite ion is contained. Therefore, when only bleaching solution is treated by evaporation, the method of the present invention is effective because sulfite ion is added to the bleach-fixing solution, if desired.

Also, even in the waste solution containing sulfite ion, sulfite ions will be reduced and disappeared with lapse of time. Particularly, in the case of a mixed waste solution, the reduction speed is rapid and the ions will be disappeared after storage for several days and therefore, also in such case, the method of the present invention is effective.

In the present invention, "to evaporate and concentrate in the presence of sulfite ions" means that no sulfite ion is required to be freshly added in the case when the waste solution received in the evaporation tank contains sulfite ion, but it is preferable to add freshly sulfite ion. When the waste solution contains no sulfite ion, when the sulfite ion in said waste solution is disappeared by storage, or when it is disappeared in the heating process, evaporation and concentration are conducted while permitting sulfite ions to exist in the waste solution by adding freshly sulfite ions. Sulfite ions and compounds capable of releasing sulfite ions may be permitted to exist previously in the waste solution in the evaporation tank, or alternatively they may be added continuously or intermittently in the process of evaporation and concentration. Also, they may be permitted to exist in the stored waste solution, or said waste solution may be replenished continuously or intermittently to the evaporation tank.

In the present embodiment, sulfite ions ($SO_3^{2-}$) in the evaporation tank may exist at a concentration of $5 \times 10^{-4}$ gram ion/l, preferably $1 \times 10^{-3}$ gram ion/l or more, more preferably $5 \times 10^{-3}$ gram ion/l or more to have the inhibition effect of bad odor. Also, since the problems such as generation of SO₂ gas, etc. will ensue if the existing amount of sulfite ions is too much, the concentration should be preferably 4 gram ion/l or less, more preferably 2 gram ion/l or less, particularly preferably 0.5 gram ion/l or less.

In the present invention, "the compound capable of releasing sulfite ions ($SO_3^{2-}$)" is a compound which releases sulfite ions in the evaporation tank by hydrolysis or a heating decomposition, etc.

Specifically, the following compounds may be included. First, inorganic sulfites such as $K_2SO_3$, $Na_2SO_3$, $(NH_4)_2SO_3$, $NaHSO_3$, $KHSO_3$, $Na_2S_2O_5$, $K_2S_2O_5$, etc. are included, and one or two or more of these can be selected and used. This is a compound capable of releasing $SO_3^{2-}$ primarily through hydrolysis when added in the evaporation tank.

Also, bisulfite addition compounds represented by the formula (I) or (II) shown below may be included, and at least one compound selected from these can be used.

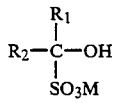

Formula (I)

In the above formula, $R_1$ represents a hydrogen atom or an alkyl group having 1 to 8, preferably 1 to 4 carbon atoms, $R_2$ represents an alkyl group having 1 to 8, preferably 1 to 4 carbon atoms, and M represents an alkyl metal or an ammonium group.

One of preferable carbonyl bisulfite addition compounds represented by the formula (I) is one wherein $R_1$ is a hydrogen atom, $R_2$ is an alkyl group having 1 to 4 carbon atoms, while another compound is one wherein each of $R_1$ and $R_2$ is an alkyl group having 1 to 4 carbon atoms.

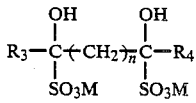

Formula (II)

In the above formula, $R_3$ and $R_4$ each represent a hydrogen atom or an alkyl group having 1 to 8, preferably 1 to 2 carbon atoms, M represents an alkali metal or an ammonium group and n represents an integer of 0 to 6, preferably 1 to 4.

One of the carbonyl bis-bisulfite addition compounds represented by the formula (II) is one wherein each $R_3$ and $R_4$ is a hydrogen atom and n is 1 to 4, while another compound is one wherein each of $R_3$ to $R_4$ is an alkyl group having 1 to 2 carbon atoms, and n is an integer of 1 to 4.

In the following, specific examples of bisulfite addition compounds represented by the above formula (I) or (II) are shown, but the present invention is not limited thereto.

Exemplary bisulfite addition compounds of the formula (I)
I - (1) sodium acetoaldehyde bisulfite
I - (2) sodium propionaldehyde bisulfite
I - (3) sodium butylaldehyde bisulfite
I - (4) sodium acetone bisulfite
I - (5) sodium butanone bisulfite
I - (6) sodium pentanone bisulfite Exemplary bisulfite addition compounds of the formula (II)
II - (1) sodium succinic aldehyde bisbisulfite
II - (2) sodium glutaraldehyde bisbisulfite
II - (3) sodium β-methyglutaraldehyde bisbisulfite
II - (4) sodium maleic dialdehyde bisbisulfite
II - (5) sodium 2,4-pentanedione bisbisulfite The above bisulfite addition compounds may be used either singly or as a combination of two or more compounds.

Other than the compounds as mentioned above, as the compound capable of releasing $SO_3^{2-}$ by decomposition by heating, the compounds represented by the following formula (A) may be included.

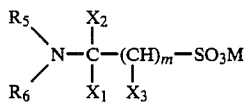

Formula (A)

In the above formula, $R_5$ and $R_6$ each represent a hydrogen atom, or an alkyl group which may have substituent, an acyl group which may have substituent or a carbamoyl group which may have substituent; and also $R_5$ and $R_6$ may be linked together to form a ring.

In $R_5$ or $R_6$, the alkyl group which may have substituent is preferably a substituted or unsubstituted alkyl group having 1 to 6 carbon atoms, and examples of unsubstituted alkyl group may include methyl, ethyl and butyl groups, and substituted alkyl groups may include alkyl group substituted with hydroxy group (e.g. 2-hydroxyethyl group), alkyl groups substituted with alkoxy group. Here, as the alkoxy group, methoxy, ethoxy, butoxy groups may be included. Also, as the acyl group or carbamoyl group which may have substituent, there may be included preferably acyl group or carbamoyl group which may have aliphatic group or aromatic group as the substituent, and examples thereof may include unsubstituted acyl group such as acetyl group, etc. or otherwise substituted acyl groups such as aminoacetyl group (another name: glycidyl group), etc. having amino group as the substituent. Also, in addition to unsubstituted carbamoyl group, there may be included those having substituents such as N-methylcarbamoyl group, N,N-dimethylcarbamoyl group, N,N-tetramethylenecarbamoyl group, etc.

As the ring formed by linking of $R_5$ and $R_6$, for example, morpholine ring, piperazine ring, pyrrolidine ring, etc. may be included. Preferred as $R_5$ and $R_6$ are hydrogen atom, methyl group, ethyl group, particularly preferably hydrogen atom.

$X_1$, $X_2$ and $X_3$ each represent a hydrogen atom or an alkyl group which may have substituent.

In $X_1$ to $X_3$, the alkyl group which may have substituent may be preferably a substituted or unsubstituted alkyl group having 1 to 5 carbon atoms, as exemplified by methyl, ethyl, n-propyl, i-propyl, n-butyl, iso-butyl, sec-butyl and other unsubstituted alkyl groups, and also substituted alkyl groups having substituents such as hydroxy group, carboxy group, etc., including hydroxymethyl, 3-hydroxyethyl, 2-hydroxyethyl, carboxymethyl, 2-carboxyethyl, 3-carboxypropyl, 4-carboxybutyl, 2-hydroxy-4-carboxybutyl groups, etc.

Preferred as $X_1$, $X_2$ and $X_3$ are hydrogen atom, methyl group, ethyl group, methyl groups substituted with hydroxy, particularly preferably hydrogen atom.

M represents a hydrogen atom, or an alkali metal (e.g. sodium, potassium, etc.). m is an integer of 0 to 2, preferably 0 to 1, particularly preferably 0.

In the following, specific examples of the compound represented by the formula (A) to be used in the present invention are shown, but the present invention is not limited thereto.

[Exemplary compounds]

$NH_2CH_2SO_3H$     A-(1)

$NH_2CH_2CH_2SO_3H$     A-(2)

$\begin{array}{c}CH_3\\ \phantom{x}\\ H\end{array}\!\!\!\!>\!\!N\!-\!CH_2SO_3H$     A-(3)

$\begin{array}{c}C_2H_5\\ \phantom{x}\\ H\end{array}\!\!\!\!>\!\!N\!-\!CH_2SO_3H$     A-(4)

$\begin{array}{c}CH_3CO\\ \phantom{x}\\ H\end{array}\!\!\!\!>\!\!N\!-\!CH_2SO_3H$     A-(5)

$\begin{array}{c}H_2NCH_2CO\\ \phantom{x}\\ H\end{array}\!\!\!\!>\!\!N\!-\!CH_2SO_3H$     A-(6)

$\begin{array}{c}CH_3\\ \phantom{x}\\ CH_3\end{array}\!\!\!\!>\!\!N\!-\!CH_2SO_3H$     A-(7)

$\begin{array}{c}CH_3\\ \phantom{x}\\ NH_2CH_2CO\end{array}\!\!\!\!>\!\!N\!-\!CH_2SO_3H$     A-(8)

$\begin{array}{c}CH_3OC_2H_4\\ \phantom{x}\\ CH_3OC_2H_4\end{array}\!\!\!\!>\!\!N\!-\!CH_2SO_3H$     A-(9)

$NH_2CH\!-\!SO_3H$     A-(10)
    |
   $C_2H_5$ $NH_2CH\!-\!SO_3H$     A-(11)
    |
   $CH_3$ $NH_2CH\!-\!SO_3H$     A-(12)
    |
   $CH_2COOH$ $NH_2CH\!-\!SO_3H$     A-(13)
    |
   $CH_2OH$ $\begin{array}{c}HOH_4C_2\\ \phantom{x}\\ H\end{array}\!\!\!\!>\!\!N\!-\!CH_2SO_3H$     A-(14)

$\begin{array}{c}NH_2OC\\ \phantom{x}\\ H\end{array}\!\!\!\!>\!\!N\!-\!CH_2SO_3H$     A-(15)

$NH_2CH_2CH_2CH_2SO_3H$     A-(16)

-continued
[Exemplary compounds]

$CH_3\!-\!NHCH_2CH_2SO_3H$     A-(17)

$\begin{array}{c}CH_3\\ \phantom{x}\\ CH_3\end{array}\!\!\!\!>\!\!N\!-\!CH_2CH_2SO_3H$     A-(18)

$\begin{array}{c}CH_3OC_2H_4\\ \phantom{x}\\ CH_3OC_2H_4\end{array}\!\!\!\!>\!\!N\!-\!CH_2CH_2SO_3H$     A-(19)

$\begin{array}{c}C_2H_5\\ \phantom{x}\\ C_2H_5\end{array}\!\!\!\!>\!\!N\!-\!CH_2CH_2SO_3H$     A-(20)

$O\!\!\left<\!\!\begin{array}{c}\phantom{xx}\\ \phantom{xx}\end{array}\!\!\right>\!\!N\!-\!CH_2SO_3H$     A-(21)

$\left<\!\!\begin{array}{c}\phantom{xx}\\ \phantom{xx}\end{array}\!\!\right>\!\!N\!-\!CH_2SO_3H$     A-(22)

The above compound may abe added either singly or as a combination of two or more compounds into the waste solution.

As for the place where the above compound capable of releasing $SO_3^{2-}$ is added in the present embodiment, it may be contained in the waste solution before feeding to the evaporation tank, or it may be also added externally after the waste solution was fed into the evaporation tank before initiation or after initiation of heating.

When the above compound capable of releasing $SO_2^{2-}$ is fed externally, it may be fed by the pump 11 from the tank 10 as shown in FIG. 1, or it may be also fed through the head pressure by providing the tank 10 above the evaporation tank 3 without use of the pump 11.

In the present invention, when the compound capable of releasing $SO_3^{2-}$ is liquid, it can be added, for example, as shown in FIG. 1, but when it is solid, said solid may be added directly to the waste solution or the concentrate, or alternatively it may be previously dissolved in the tank and added as shown in FIG. 1.

In the present invention, when two or more kinds of compounds capable of releasing $SO_3^{2-}$ are used, it is preferable to provide a plural number of tanks for the respective compounds added when they are externally added from the tanks as shown in FIG. 1, but one tank can be sometimes commonly used depending on the physical properties of the compounds.

Referring now to the accompanying drawing, an example of the case of the method for inhibiting bad odor according to the embodiment (ii) of the present invention is described.

Figure 2:
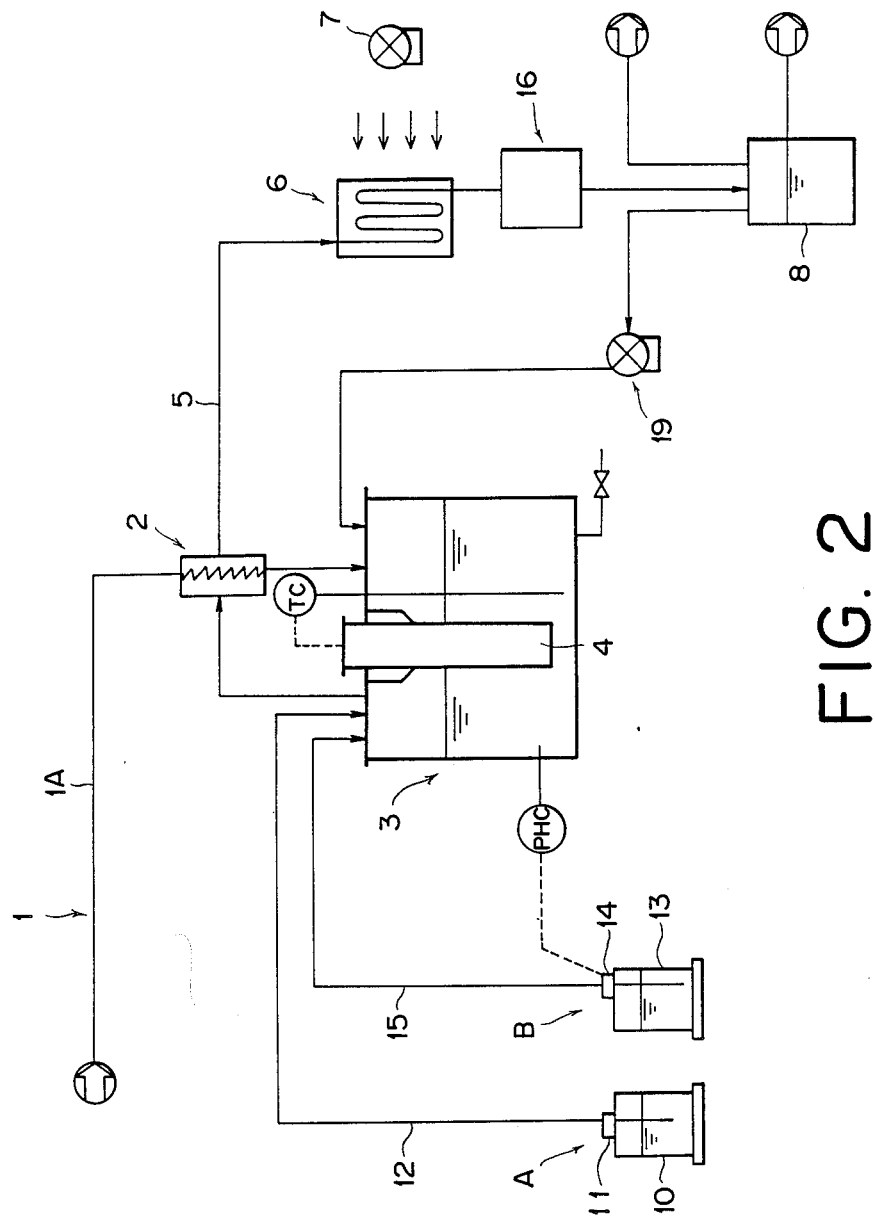

FIG. 2 is a conceptional view showing one example of the method for inhibiting bad odor of the present embodiment.

In FIG. 2, 1 is a means for feeding a photographic processing waste solution, 1A is a pipe for feeding waste solution to be used for said feeding means 1, 2 is a preheater for preheating the photographic processing waste solution before heating, 3 is an evaporation tank, 4 is a heating means such as a heater, 5 is a vapor discharging pipe for discharging the vapor generated when the waste solution within the evaporation tank 3 is heated out of the evaporation tank 3, 6 is a gas cooler for cooling said vapor, 7 is a fan for gas cooler, and 16 is a catalyst of the present invention provided on the discharging passage for the evaporated gas. 8 is a distillate tank for storing the distillate obtained by cooling of the above vapor, 9 is a circulating fan for returning the dehumidified gas to the evaporation tank, B is a means for feeding a pH controller into the photographic processing waste solution, comprising, for example, a pH controlling agent tank 13, a pH controlling agent pump 14, a pH controlling agent feeding pipe 15, a pH controller pHC, etc. A is a means for feeding sulfite ions and a compound capable of releasing sulfite ions to the photographic processing waste solution, comprising, for example, sulfuous acid tank 10, sulfite-containing compound pump 11, sulfite-containing compound feeding pipe 12, etc. TC is a temperature controller.

To describe the outline of the process for evaporation and concentration treatment by use of the above device, the waste solution is fed through the waste solution feeding pipe 1A to the evaporation tank 3, and evaporated and concentrated by the heater 4. The pH of the waste solution on initiation of evaporation may be maintained at 3.0 to 14.0, preferably 4.0 to 13.0, more preferably 5.0 to 10.0. If necessary, in the waste solution, sulfite ions and/or a compound capable of releasing sulfite ions are contained. The heating temperature is suitably controlled by the temperature controller TC.

The evaporated gas is subjected to heat exchange with the waste solution by the preheater 2, delivered to the gas cooler 6 to be cooled and thereafter contacts the catalyst 16 of the present invention, whereby ammonia gas is decomposed. The distillate formed by cooling is stored in the distillate tank 8, and since it has no sensible bad odor and also satisfies the water discharging regulation values such as BOD, COD, SS, etc., it can be discharged into rivers, etc. or reutilized if desired. The upper gas on the distillate has also no sensible bad odor, and also contains no component which causes a problem, and therefore it can be no trouble in discharging of the distillate.

On the other hand, the waste solution in the evaporation tank is reduced in volume as the lapse of evaporation and concentration time to be concentrated. The heater 4 for heating is stopped by actuation of the timer to complete heating. As the residual concentrate is discharged out of the system.

Next, the method for inhibiting bad odor which is an example of the present embodiment is to be described in detail.

As the catalyst of the present invention, metals of the above (a) to (d) or compounds thereof can be used, and among them it is preferable to use Pt, Pd, Rh and Ir.

As the compound of the above metals, there may b included oxides and chlorides of various metals and chloroauric acid, hexachloro-platinum, rhodium chloride, nickel formate, etc.

As the catalyst carrier, there may be employed, for example, ceramics composed mainly of $Al_2O_3$, $SiO_2$, $ZrO_2$, etc.

The shape of the catalyst is not particularly limited, but a shape through which the evaporated gas is permeable may be employed, for example, shapes such as honeycomb, granular, columnar, crushed form, etc. may be used. When the shape is granular, etc., the catalyst should be preferably used as packed in a filling tower. In the case of honeycomb shape, the catalyst may be provided by coating on the honeycomb carrier. The catalyst amount used in the present invention is determined depending on the gas amount treated (which is proportional to the amount of waste solution) and special velocity, preferably 0.5 ml to 1 l (bulk volume) per 1 l of the waste solution treated, more preferably 1 ml to 0.1 l (bulk volume).

The contact temperature of the catalyst in the present invention may be preferably 20° to 400° C., more preferably 50° to 350° C., particularly preferably 120° to 250° C. Within this temperature range, decomposition of $NH_3$ is preferably promoted.

The catalyst of the present invention may be provided on the discharging route of the evaporated gas, and may be either before or after cooling of the evaporated gas, but preferably after cooling of the evaporated gas, namely after the gas cooler 6 in the above example, and further preferably provided in the discharging line of the dry gas after condensation from the standpoint that the amount of heat generated can be small. Also, the catalyst of the present invention, as different from activated charcoal, etc., has the effect that contact treatment can be continued even at the point when the evaporated gas contains water vapor before condensation.

In the present embodiment, other than the catalyst of the present invention, an adsorption equipment conventionally used such as of activated charcoal or zeolite can be also added.

In the present invention, the pH of the waste solution on initiation of evaporation may be preferably within the range from 3.0 to 14.0, more preferably from 4.0 to 13.0, particularly from 5.0 to 10.0.

If the pH is less than 3.0, $H_2S$ and $SO_2$ will be generated remarkably to be not preferable for activity although it may not have deleterious effect on the catalyst, and therefore the pH 3 or lower is preferred. On the other hand, if pH is too high $NH_3$ will be remarkably generated, whereby loading on the catalyst becomes too high.

Referring now to the accompanying drawing, an example of the case of the method for inhibiting bad odor according to the embodiment (iii) of the present invention is to be described.

Figure 3:
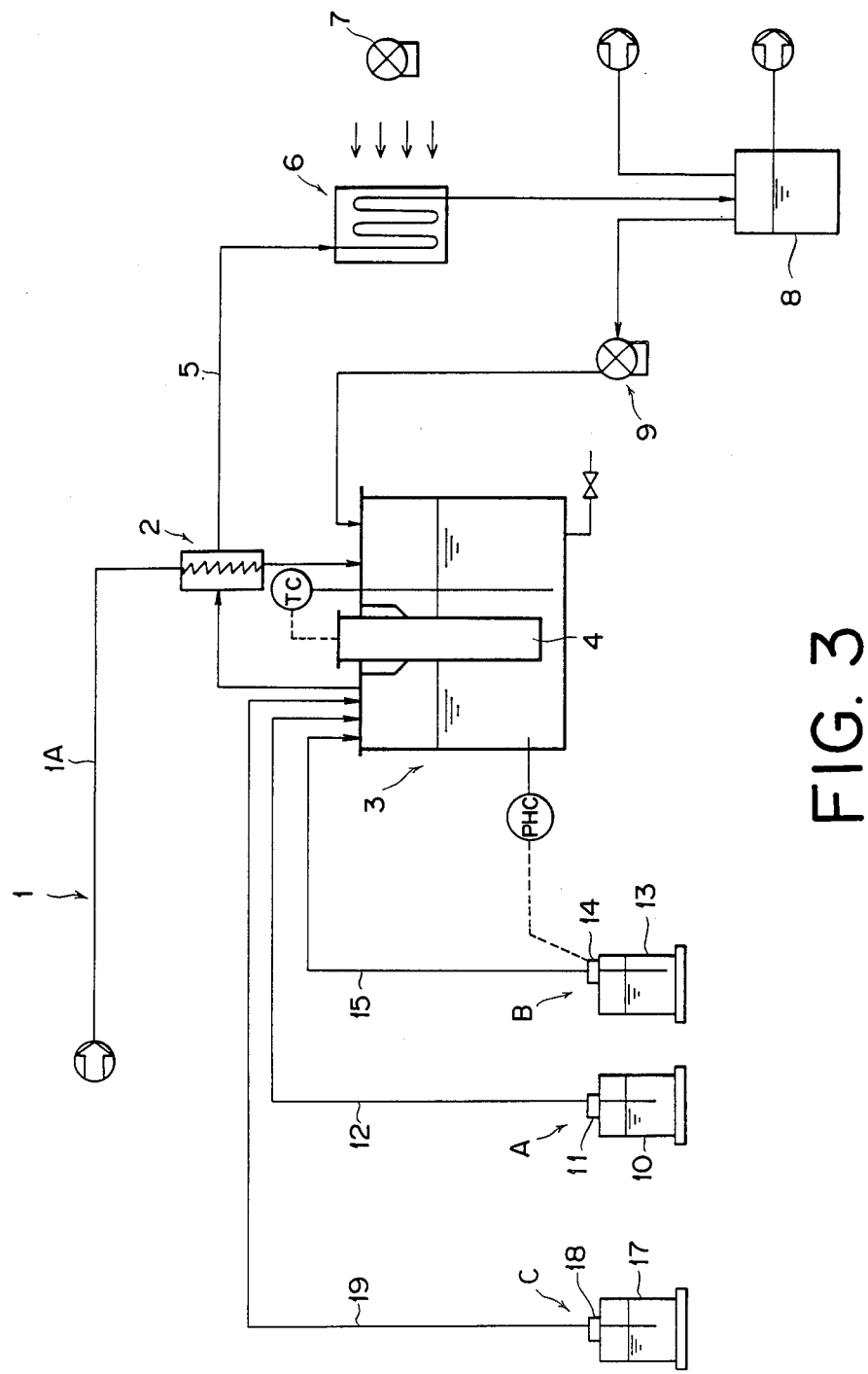

FIG. 3 is a conceptional drawing showing one example of the method for inhibiting bad odor of the present embodiment.

In FIG. 3, 1 is a means for feeding a photographic processing waste solution, 1A is a waste solution feeding pipe to be used for said feeding means 1, 2 is a preheater for preheating the photographic processing waste solution before heating, 3 is an evaporation tank, 4 is a heating means such as a heater, 5 is a vapor discharging pipe for discharging the vapor generated when the waste solution within the evaporation tank 3 is heated out of the evaporation tank 3, 6 is a gas cooler for cooling said vapor, 7 is a fan for gas cooler, 8 is a distillate tank for storing the distillate obtained by cooling of said vapor, 9 is a circulating fan for returning the dehumidified gas to the evaporation tank, C is a means for feeding water-soluble polymer to the photographic processing waste solution, comprising a water-soluble polymer tank 17, a water-soluble polymer pump 18, a water-soluble polymer feeding pipe 19, etc. B is a means for feeding a pH controlling agent to the photographic processing waste solution, comprising, for example, a pH controlling agent tank 13, a pH controlling agent pump 14, a pH controlling agent feeding pipe 15, a pH controller pHC, etc. A is a means for feeding sulfite ions or a compound releasing sulfuous acid to the photographic processing waste solution, comprising, for example, a sulfurous acid tank 10, a sulfurous acid pump 11, a sulfurous acid feeding pipe 12, etc. TC is a temperature controller.

To describe about the outline of the process for evaporation and concentration treatment by use of the device as described above, the waste solution is fed through the waste solution feeding pipe 1A into the evaporation tank 3, and evaporated and concentrated by the heater 4. This evaporation and concentration is conducted in the presence of a water-soluble polymer. During this operation, the pH of the waste solution (concentrate) is preferably maintained at 3.0 to 11.0, preferably at 4.0 to 8.0, more preferably at 5.0 to 7.0. If necessary, the waste solution contains sulfite ions and a compound capable of releasing sulfite ions as described below. The heating temperature is suitably controlled by the temperature controller TC.

The vapor is subjected to heat exchange with the waste solution in the preheater 2, delivered to the gas cooler 6 to be cooled and controlled in humidity, followed by separation of the distillate. The distillate is stored in the distillate tank 8, and since it has no sensible bad odor and also satisfies the discharging water regulation values such as BOD, COD, SS, etc., it can be discharged into the rivers, etc. or reutilized, if desired. Since the gas separated from the distillate has no sensible bad odor and also contains no component which causes a problem, and therefore it can be discharged out of the system.

On the other hand, the waste solution in the evaporation tank is reduced in volume with lapse of evaporation and concentration time to be concentrated. The heater 4 for heating is stopped by the actuation of, for example, a timer to complete heating. The residual concentrate is discharged out of the system.

Next, the method for inhibiting bad odor which is an example of the present embodiment is to be described in detail.

In the present embodiment, "to evaporate and concentrate in the presence of a water-soluble polymer" is to perform evaporation and concentration while permitting a water-soluble polymer to exist in the waste solution or the concentrate before heating.

The water-soluble polymer to be used in the present invention should preferably have a polymerization degree of 30 to 10,000, more preferably 100 to 5,000, particularly preferably 200 to 3,000.

The existing amount of the water-soluble polymer of the present invention may be preferably 0.01 to 300, more preferably 0.05 to 100, most preferably 0.1 to 80 per liter of the photographic processing waste solution.

As the water-soluble polymer of the present invention, compounds having OH groups or CO groups are preferred. More preferably, the compounds (1) to (5) shown below may be included.
(1) polyvinyl pyrrolidone type compound
(2) polyvinyl alcohol
(3) gelatin
(4) cellulose compound
(5) isobutylene-maleic anhydride copolymer The above polyvinyl pyrrolidone type compound (1) to be used in the present invention is a polymer having pyrrolidone nucleus unit in the molecular structure, which may be either homopolymer of vinyl pyrrolidone alone or copolymer with another copolymerizable monomer, but it is required to be water-soluble as the polymer.

Representative examples of other monomers copolymerizable with the above vinyl pyrrolidone may be vinyl esters, acrylic acid esters, methacrylic acid esters, acrylic acid, methacrylic acid, styrene, etc. Examples of vinyl esters may include vinyl acetate, vinyl propionate, vinyl butyrate and the like, while examples of acrylic esters may include methyl ester, ethyl ester, butyl ester, 2-ethylhexyl ester and the like. In the case of these copolymers, the copolymer ratio of these monomers may be preferably within the range of 5 to 100 mole % relative to vinyl pyrrolidone.

The vinyl pyrrolidone polymer may have an average molecular weight, which is not particularly limited, but preferably 500 to 800,000, more preferably 2,000 to 400,000.

The average molecular weight of the polymer can be determined according to a conventional method, for example, according to the method as described below.

An amount of 1,000 g of polymer sample is accurately weighed, placed in a 100 ml measuring flask and distilled water is added thereto to prepare an aqueous 1% solution, and thereafter the viscosity of said aqueous solution and water which is the solvent are measured respectively. For measurement of viscosity, a Ubbelohde type capillary viscometer was utilized. With said viscometer containing the solution to be measured being suspended within a thermostat and maintained at 20° C.±0.01° C. for 30 minutes, the time required for the solution to pass between the two gauges was measured, and an average value for several times was determined and relative viscosity was calculated from the relationship shown by the following formula:

$$\eta \text{ rel} = \frac{\text{flowing time of solution}}{\text{flowing time of solvent}}$$

From the relative viscosity, K value was determined from the equation of Phikencher (see Physikalishce U. technologische Prüfungsverfahren für Lacke und ihre Rohstoffe, 1953 Edit.) and the average molecular weight was determined in a conventional manner from the K value.

In the following, representative specific examples of the vinyl pyrrolidone polymer to be used in the present invention are shown, which are not limitative of the present invention.

Exemplary compounds (1) polyvinyl pyrrolidone (average molecular weight: about 40,000)
(2) polyvinyl pyrrolidone (average molecular weight: about 9,000)
(3) polyvinyl pyrrolidone (average molecular weight: about 16,000)
(4) vinyl pyrrolidone-vinyl acetate copolymer (copolymer molar ratio=7:3) (average molecular weight: 4,000)
(5) vinyl pyrrolidone-methyl acrylate copolymer (copolymer molar ratio=7:3) (average molecular weight: 1,000)
(6) vinyl pyrrolidone-ethyl acrylate copolymer (copolymer molar ratio=7:3) (average molecular weight: 25,000)

(7) vinyl pyrrolidone-butyl acrylate copolymer (copolymer molar ratio=7:3) (average molecular weight: 7,000)

(8) vinyl pyrrolidone-2-ethylhexyl acrylate copolymer (copolymer molar ratio=7:3) (average molecular weight: 18,000)

(9) vinyl pyrrolidone-styrene copolymer (copolymer molar ratio=1:3) (average molecular weight: 20,000)

As the above polyvinyl alcohol (2) to be used in the present invention, either completely saponified product or partially saponified product may be employed. During manufacture, when the acetyl groups in the polyvinyl acetate molecule are converted to hydroxyl groups in the saponification step, those in which the saponification reaction has been progressed substantially completely are referred to as "completely saponified product", while those in which the saponification reaction was stopped in the course to have acetyl groups remained to some extent as "partially saponified product".

The progress degree of the saponification reaction is called "saponification degree", and is represented in "mole %".

These relationships may be represented by the following schemes.

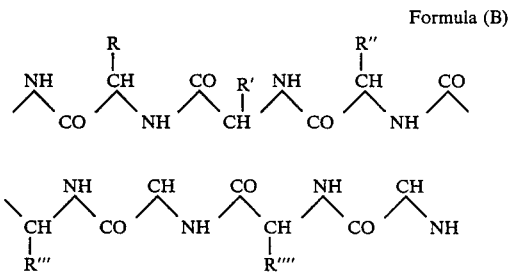

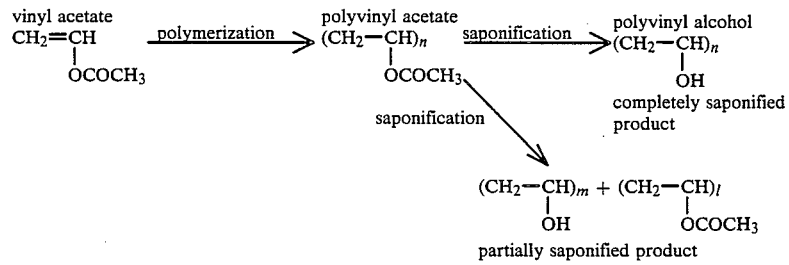

partially saponified product wherein n, m and l represent polymerization degree and $(m/m+l)\times 100$ represents a saponification degree.

In the present invention, in place of or together with polyvinyl alcohol, a modified polyvinyl alcohol, particularly a strong acid modified polyvinyl alcohol, a weak acid modified polyvinyl alcohol, a partially acetalated polyvinyl alcohol, etc. may be also used.

Polyvinyl alcohols of the present invention are also available from commercial products, such as PVA105, PVA203, PA204, PVA205, PVA405 (all are produced by Kuraray Co.), GOHSENOL NL-05 GOHSENOL GL-03, GOHSENOL AL-02, GOHSERAN (all are produced by Nippon Gosei Kagaku Kogyo Co.), DENKAPOVAL D-02, DENKAPOVAL B-03 (all are produced by Denki Kagaku Kogyo Co.), C-25, C-20, C-201, C-17, A, C-10, C-05, MA-23, MA-17, MA-5, PA-24, PA-20, PA-18, PA-15, PA-10, PA-05 (all are produced by Shinetsu Kagaku Co.), etc.

Also, of the above modified polyvinyl alcohols, examples of strong acid modified polyvinyl alcohols may include polyvinyl alcohols modified with aryl acid or vinyl sulfonic acid copolymer (10% or less), examples of weak acid modified polyvinyl alcohols carboxyl-modified polyvinyl alcohols, polyvinyl alcohols modified with acrylic acid-methacrylic acid copolymer (10% or less), and examples of partially acetalated polyvinyl alcohols polyvinyl formal, polyvinyl butyral, etc. (with proviso that acetalation degree is 15% or less, preferably 12% or less), etc.

The above modified polyvinyl alcohols are also available from commercial products, and an example of the strong acid modified polyvinyl alcohol is GOHSERAN (produced by Nippon Gosel Kagaku Co.), and an example of the weak acid modified polyvinyl alcohol is KL-506 (produced by Kuraray Co.).

As the above gelatin (3) to be used in the present invention, it comprises the so-called polypeptide chains represented by the formula (B) shown below, and said chain is formed sterically.

Formula (B)

$$\begin{array}{c} R \\ | \\ NH\text{—}CH\text{—}CO\text{—}R'\text{—}NH\text{—}CH\text{—}CO \\ | \\ CO\text{—}NH\text{—}CH\text{—}CO\text{—}NH \\ \\ R'' \end{array}$$

$$\begin{array}{c} NH\text{—}CH\text{—}CO\text{—}NH\text{—}CH \\ | \\ CH\text{—}CO\text{—}NH\text{—}CH\text{—}CO\text{—}NH \\ | \quad\quad\quad\quad\quad\quad | \\ R''' \quad\quad\quad\quad\quad R'''' \end{array}$$

wherein R, R', R", R'" and R"" each represent an amino acid residue (e.g. glycine, alanine, isoleucine, leucine, valine, phenylalanine, tyrosine, tryptophan, serine, threonine, cystine, methionine, proline, oxyproline, lysine, oxylysine, arginine, histidine, aspartic acid, glutamic acid, amide nitrogen). The dotted line indicates that it is connected by a side valence. When it is under gel state, a network structure is formed by entanglements of such chain. As the temperature is increased, the motion of single cells of this micelle is gradually enlarged to make the network structure to be separated from each other.

As the gelatin to be used in the present invention, in addition to lime-treated gelatin, there may be also employed the acid-treated gelatin, or by the enzyme-treated gelatin as described in Bull, Soc, Sci, Phot, Japan No. 16, p. 30 (1966), and also hydrolyzates or enzyme decomposed products of gelatin can be used. As the gelatin derivative, there may be used those obtained by reacting various compounds such as acid halide, acid anhydride, isocyanate, bromoacetic acid, alkanesultones, vinyl sulfonamides, maleinimide compounds, polyalkyleneoxides, epoxy compounds, etc. with gelatin. Their specific examples are disclosed in U.S. Pat. No. 2,614,928, No. 3,132,945, No. 3,186,846 and No. 3,312,553, U.K. Pat. No. 861,414, No. 1,033,189 and No. 1,005,784, and Japanese Patent Publication No. 26845/1967, etc.

As the above cellulose compound (4) to be used in the present invention, for example, cellulose esters or ethers obtained by esterification or etherification of hydroxyl groups of cellulose $(C_6H_7O_2(OH)_3)$ may be employed.

Cellulose esters are derivatives having the three hydroxyl groups of cellulose appropriately esterified with acids, and higher fatty acid esters esterified with nitric, sulfuric, acetic, propionic, butyric acid and the like, mixed esters of nitric and acetic acid, mixed ester of acetic and butyric acid, etc. have been known.

Cellulose ethers are obtained by etherification of hydroxyl groups of cellulose, and there may be included alkyl ethers such as of methyl, ethyl, etc. or benzyl ether. For preparation of cellulose ethers, for example, the following method can be employed. That is, cellulose is coverted to an alkali cellulose (mercerization), and this is allowed to react with an alkyl or aralkyl chloride, or a sulfuric acid salt, etc. With the progress of the reaction, cellulose is swelled to be decomposed and partially glued to become a viscous paste. This is purified, whereby a cellulose ether can be obtained.

Specific examples of the above cellulose compound may include carboxymethyl cellulose, hydroxyethyl cellulose, hydroxypropyl cellulose, methyl cellulose, ethyl cellulose, ethylhydroxyethyl cellulose, carboxymethylethyl cellulose.

As the cellulose compound to be used in the present invention, among the above cellulose compounds, hydroxypropyl cellulose represented by the formula shown below (C) is preferred.

Formula (C)

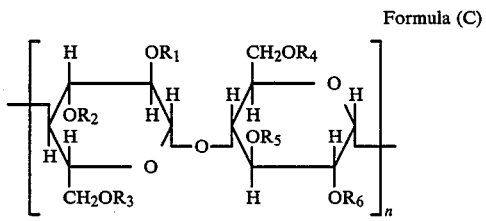

wherein $R_1$ to $R_6$ each represent a hydrogen atom, $-CH_3$, $-C_2H_5$, $-C_2H_4OH$, $(CH_2CH(CH_3)-O-)_mH$ (m is an integer of 1 or more), $-CH_2COOH$, $-CH_2COOCH_3$, $-CH_2COOC_2H_5$, $-C_2H_4OC_2H_5$. n is a positive integer.

The above isobutylene-maleic anhydride copolymer (5) to be used in the present invention is represented by the following formula (D).

Formula (D)

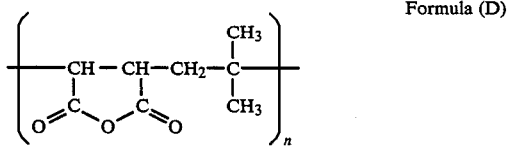

wherein n is a positive integer.

The above compounds (1) to (5) may be used either individually in the waste solution, or two or more kinds may be added in combination.

As for the place in which the water-soluble polymer of the present invention is added, it may be contained in the waste solution before fed into the evaporation tank 3, or alternatively after fed into the evaporation tank, it may be added externally before initiation of heating or after initiation of heating. Further, the water-soluble polymer of the present invention may be contained in the evaporation tank, and thereafter the photographic processing waste solution may be fed.

When the water-soluble polymer of the present invention is externally fed, as shown in FIG. 3, it may be fed from the tank 16 by the pump 17, or it may be fed through the head pressure by providing the tank 16 above the evaporation tank 3 without use of the pump 17.

When the water-soluble polymer of the present invention is a liquid, it can be added, for example, as shown in FIG. 3, but when it is a solid, said solid may be added directly to the waste solution or to the concentrate, or it may be added as shown in FIG. 3 as dissolved previously in the tank.

When two or more kinds of the water-soluble polymer of the present invention are used and when they are externally added from the tank as shown in FIG. 3, it is preferable to provide a plurality of tanks for respective compounds added, but depending on the physical properties of the compounds, one tank can be used commonly for plural compounds in some cases.

Referring now to the accompanying a drawing, an example of the case of the method for inhibiting bad odor according to the embodiment (iv) of the present invention is to be described.

Figure 4:
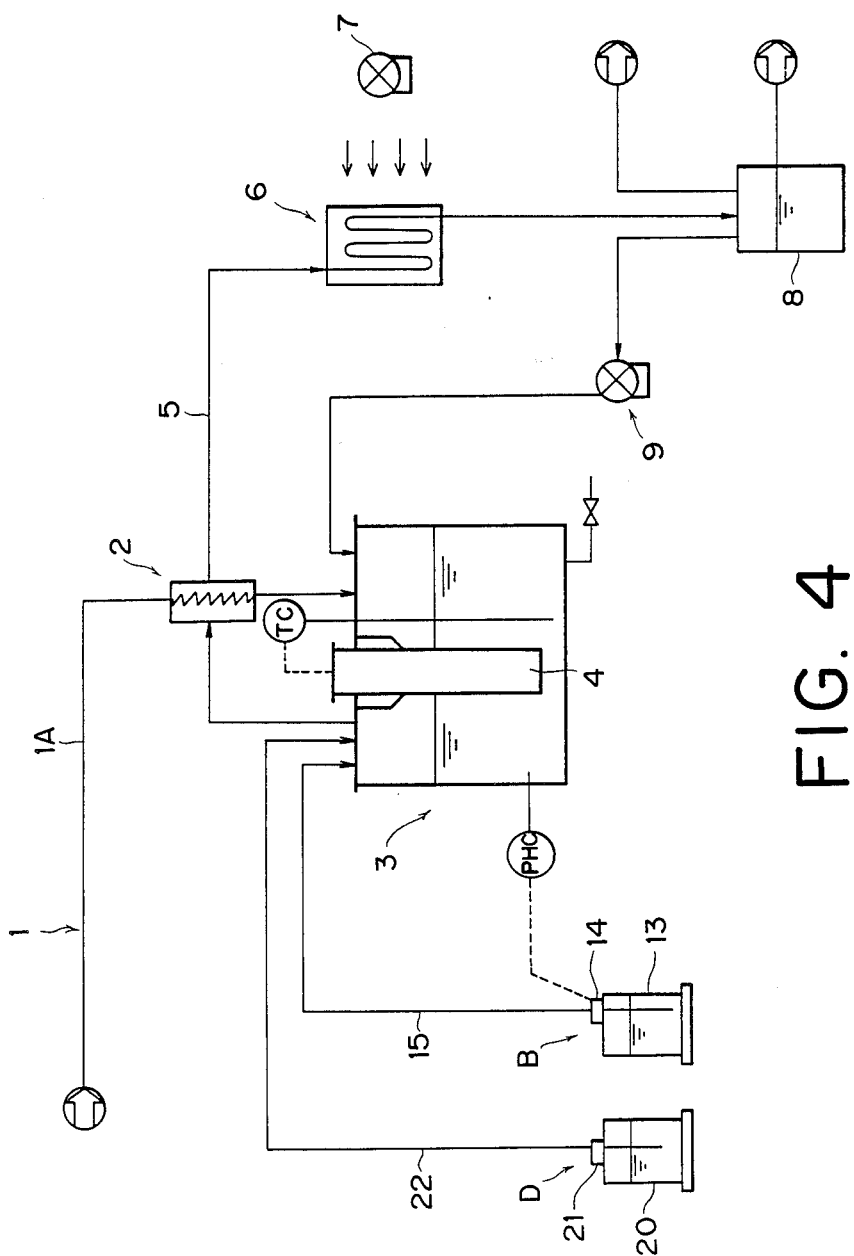

FIG. 4 is a conceptional view showing one example of the method for inhibiting bad odor of the present embodiment.

In FIG. 4, 1 is a means for feeding a photographic processing waste solution, 1A is a waste solution feeding pipe to be used for said feeding means 1, 2 is a preheater for preheating the photographic processing waste solution before heating, 3 is an evaporation tank, 4 is a heating means such as a heater, 5 is a vapor discharging pipe for discharging the vapor generated when the waste solution within the evaporation tank 3 is heated out of the evaporation tank 3, 6 is a gas cooler for cooling said vapor, 7 is a fan for gas cooler, 8 is a distillate tank for storing the distillate obtained by cooling of said vapor, 9 is a circulating fan for returning the dehumidified gas to the evaporation tank, D is a means for feeding the oxidizing agent of the present invention to the photographic processing waste solution, comprising an oxidizing dissolving tank 20, an oxidizing agent feeding pump 21, an oxidizing agent feeding pipe 22, etc. B is a means for feeding a pH controlling agent to the photographic processing waste solution, comprising, for example, a pH controlling agent tank 13, a pH controlling agent pump 14, a pH controlling agent feeding pipe 15, a pH controller pHC, etc. TC is a temperature controller.

To describe about the outline of the process of evaporation and concentration treatment by use of the above device, waste solution is fed through the waste solution feeding pipe 1A to the evaporation tank 3, where the oxidizing agent of the present invention is added and the mixture is evaporated and concentrated by the heater 4. During this operation, the pH of the waste solution (concentrate) should preferably be maintained at 3.0 to 11.0, more preferably at 4.0 to 8.0, still more preferably at 5.0 to 7.0.

The heating temperature may be suitably controlled by the temperature controller TC.

The vapor is subjected to heat exchange with waste solution in the preheater 2, delivered to the gas cooler 6 to be cooled and controlled in humidity, and the distillate is separated. The distillate is stored in the distillate tank 8, and since it has no sensible bad odor and satisfies the discharging water regulation values such as BOD, COD, SS, etc., it can be discharged into the rivers, etc. or reutilized, if desired. The gas from which the distillate is separated has no sensible bad odor, and contains also no component which causes a problem, and therefore can be discharged out of the system.

On the other hand, the waste solution in the evaporation tank is reduced in volume with lapse of evaporation and concentration time to be concentrated. The heater 4 for heating can be stopped by, for example, actuation of a timer to complete heating. The residual concentrate is discharged out of the system.

In the following, the method for inhibiting bad odor which is an example of the present embodiment is to be described in detail.

As the oxidizing agent of the present invention, there may be included:

(1) at least one selected from among peroxides;
(2) at least one selected from halogenic acids; and
(3) at least one selected from among metal oxides.

Examples of the peroxides (1) may include persulfates such as sodium persulfate, potassium persulfate, ammonium persulfate, etc.; hydrogen peroxides; peroxomonosulfates such as sodium peroxomonosulfate, potassium peroxomonosulfate, ammonium peroxomonosulfate, etc.; percarbonates such as potassium percarbonate, sodium percarbonate, etc.; ammonium perborate, potassium perborate, sodium perborate, magnesium perborate, benzoyl peroxide, peracetic acid, calcium peroxide, sodium peroxide, barium peroxide, manganese peroxide, lithium peroxide, etc., and at least one from among these can be used.

Examples of the halogenic acids (2) may include perchloric acid, potassium perchlorate, sodium perchlorate, barium perchlorate, magnesium perchlorate, potassium chlorate, sodium chlorate, potassium bromate, potassium iodate, potassium hydrogen iodate, sodium iodate, etc., and at least one from among these can be used.

Examples of the above metal oxides (3) may include $Fe_2O_3$, $Fe_3O_4$, $FeO$, $ZnO$, $NiO$, $CuO$, $MnO_2$, $KMnO_4$, $Cu_2O$, $Pb_3O_4$, $SnO$, $Bi_2O_3$, $CoO$, $Cr_2O_3$, $K_2Cr_2O_7$, $KCrO_4$, $Ce_2O_3$, $TiO_2$, $ZrO_2$, etc., and at least one from among these can be used.

Among the oxidizing agents of the present invention, peroxide oxidizing agents are preferred.

The amount of the oxidizing agent added of the present invention may be preferably 0.001 to 2 mol/l, more preferably 0.005 to 1 mol/l, particularly preferably 0.01 to 0.5 mol/l.

The oxidizing agent of the present invention may be added previously in the waste solution to be fed into the concentration tank, or it may be also added after the waste solution was fed into the concentration tank. When it is to be added in the concentration tank, it may be added either before or after initiation of evaporation and concentration.

When it is externally added to the concentration tank, a means for feeding the oxidizing agent of the present invention is used, and when the oxidizing agent of the present invention is liquid, it may be added separately from the waste solution from the oxidizing agent dissolving tank 10 by use of an oxidizing agent feeding pump 11 as shown in FIG. 4. On the other hand, when the oxidizing agent of the present invention is a solid such as powder, etc., it may be added directly into the concentration tank, or alternatively it may be also added after once dissolved in the tank 10 shown in FIG. 4.

When two or more kinds of the oxidizing agents of the present invention are employed and externally added from the tank as shown in FIG. 4, it is preferable to provide a plural number of tanks for the respective oxidizing agents added, but one tank may be sometimes commonly used depending on the physical properties of the oxidizing agent.

Referring now to the accompanying drawing, an example in the case of the method for inhibiting bad odor according to the embodiment (v) of the present invention is to be described.

Figure 5:
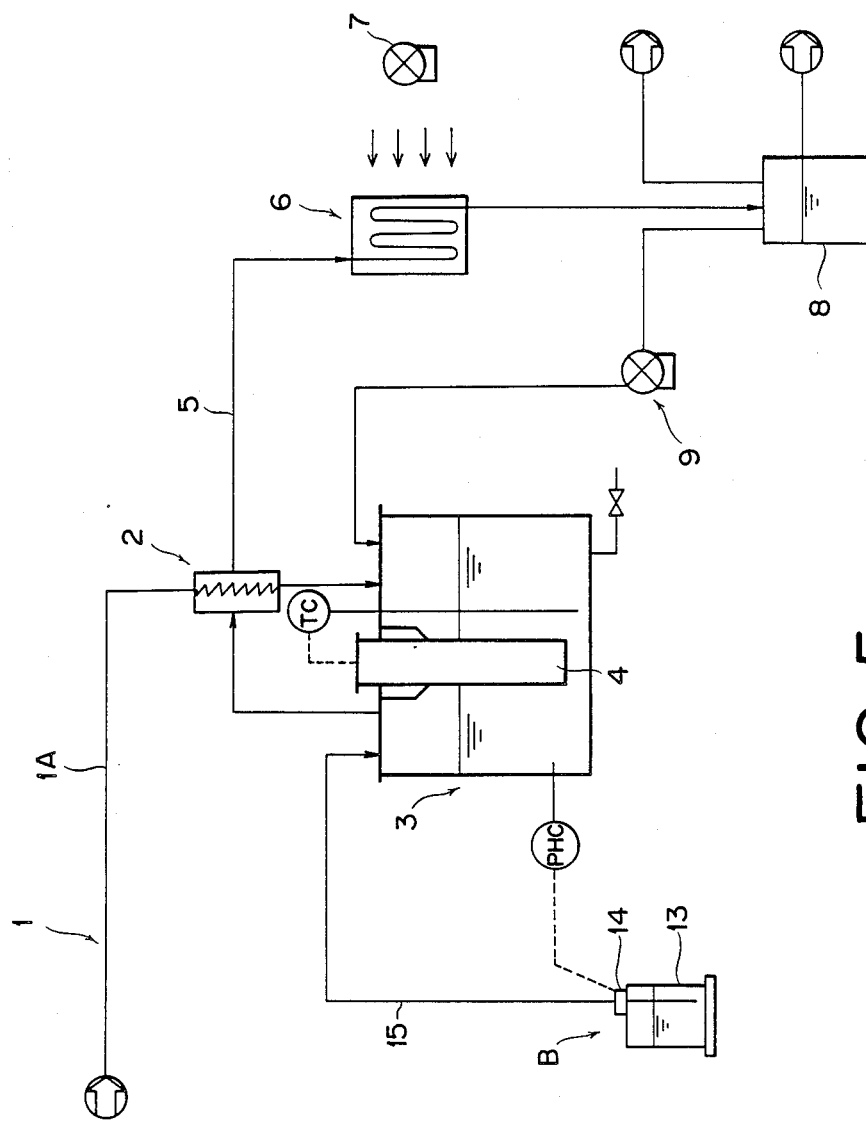

FIG. 5 is a concenptional view showing one example of the method for inhibiting bad odor.

In this figure, 1 is a means for feeding a photographic processing waste solution, 1A is a waste solution feeding pipe to be used for said feeding means 1, 2 is a preheater for preheating the photographic processing waste solution before heating, 3 is an evaporation tank, 4 is a heating means such as a heater, 5 is a vapor discharging pipe for discharging the vapor generated when the waste solution in the evaporation tank 3 is heated out of the evaporation tank 3, 6 is a gas cooler for cooling said vapor. 7 is a fan for a gas cooler, 8 is a distillate tank for storing the distillate obtained by cooling of said vapor, 9 is a circulating fan for returning the dehumidified gas to the evaporation tank, B is a means for feeding a pH controlled agent to the photographic processing waste solution, comprising, for example, a pH controlling agent tank 13, a pH controlling agent pump 14, a pH controlling agent feeding pipe 15 and a pH controller pHC, etc. TC is a temperature controller.

To describe about the outline for the process for evaporation as concentration treatment by use of the device and described above, the waste solution is fed through the waste solution feeding pipe 1A to the evaporation tank 3 and evaporated and concentrated by the heater 4. Also, the evaporation and concentration should be preferably performed under the state where the pH of the photographic processing solution is maintained at 3.0 to 11.0, more preferably 4.0 to 8.0, particularly preferably 5.0 to 7.0.

The heating temperature is suitably controlled by the temperature controller TC.

The vapor is subjected to heat exchange with the waste solution in the preheater 2, delivered to the gas cooler 6 to be cooled and controlled in humidity, and the distillate is separated. The distillate is stored in the distillate tank 8, and since it has no sensible bad odor and satisfies the discharging water regulation values such as BOD, COD, SS, etc., it can be discharged into the rivers, etc. or reutilized, if desired. The gas from which the distillate is separated has no sensible bad odor and also contains no component which causes a problem, and therefore can be discharged out of the system.

On the other hand, the waste water in the evaporation tank is reduced in volume with lapse of evaporation and concentration time to be concentrated. The heater 4 for heating is stopped by, for example, actuation of a timer to complete heating. The residual concentrate is discharged out of the system.

Next, the process for inhibiting bad odor by maintaining the pH of the concentrate at 3.0 to 11.0 is to be described in detail.

Ordinarily, the pH of the waste solution depends on the kind of the waste solution, but when it is a fixing solution with a low pH containing thiosulfate ions (e.g. ammonium thiosulfate) or sulfite ions (e.g. ammonium sulfite), etc., the pH is lower (e.g. about pH 7 to 3), while when a color developing solution or a monochromatic developing solution is mixed, the pH is considered to be higher (e.g. about pH 14 to 8).

These waste solutions will undergo pH change (primarily lowering) when heated in the evaporation tank 3. A pH controlling agent is used for controlling this pH change.

The pH controlling agent which can be used in the present invention is a controlling agent in the broad sense, and although it cannot be distinctly classified, there may be included, for example, (III) compounds for imparting buffering property to the waste solution against pH change, (IV) compounds for controlling pH (primarily elevation) by external addition against the change in pH (primarily lowering) during the evaporation process.

Examples of the above compound (III) may include:

(1) compounds having buffering property by liberation of [OH$^-$] by pH lowering such as metal oxides, metal hydroxides or metal salts of Ca, Mg, Al, Fe, Zn, etc.;

(2) compounds dissolved by pH lowering to exhibit alkalinity such as solid carbonate (e.g. $CaCO_3$);

(3) buffering agents such as organic acid (e.g. citric acid, etc.) and salts thereof;

(4) buffering agents such as inorganic acid (e.g. boric acid, phosphoric acid, etc.) and salts thereof;

(5) chelating agents of aminocarboxylic acid type such as EDTA, etc.; and (6) 1-hydroxyethylidene-1,1-diphosphonic acid, etc., and one or two or more of these can be used in combination. Examples of the above compound (IV) may include:

(1) hydroxides of alkali metals or alkaline earth metals such as NaOH, KOH, $Ca(OH)_2$, etc.;

(2) carbonates;

(3) silicates (e.g. sodium silicate, etc.);

(4) phosphates;

(5) borates;

(6) alkaline earth metal salts such as Ca salts or Mg salts, etc.; and (7) various acids such as organic acids and inorganic acids (used when pH is elevated), etc., and one or combination of two or more of these can be used.

As the preferable pH controlling agent in the present invention, carbonates, Ca salts, Mg salts and Al salts among the compounds as mentioned above may be employed.

As for the place for addition of the above pH controlling agent in the present invention, in the case of the above compound (III), it may be previously added before heating, and therefore it can be contained in the waste solution before fed into the evaporation tank 3, or alternatively it can be externally added after fed into the evaporation tank, before initiation of heating. In the case of the above compound (IV), it is of course fed externally into the evaporation tank 3.

When the pH controlling agent is externally fed, the pH controlling agent may be fed from the pH controlling agent tank 13 as shown in FIG. 5, or alternatively it may be fed through the head pressure by providing the tank 13 above the evaporation tank 3 without use of the pH controlling agent pump 14.

In the present invention, when the pH controlling agent is liquid, it can be added as shown in FIG. 1, but when it is solid, said solid may be added directly into the waste solution or the concentrate, or it may be previously dissolved in the tank before addition as shown in FIG. 5.

When two or more kinds of the pH controlling agents are used in the present invention, and added externally from the tank as shown in FIG. 5, it is preferable to provide a plural number of tanks for the respective compounds added, but one tank can be sometimes commonly used depending on the physical properties of the compound.

When the pH controlling agent is externally added as shown in FIG. 5 in the present invention, the means for feeding the pH controlling agent should preferably be actuated based on the means for detecting the pH of the waste solution and the concentrate within the evaporation tank and the control signals from said detection means. For example, it is preferable to control the amount added by the signal from the pH controller. Specifically, when the pH within the evaporation tank is lowered with lapse of evaporation and concentration time, the pump 13 can be turned on by the signal from the controller to feed the pH controlling agent. When the pump 13 is a stroke controlling system, said stroke can be also automatically controlled.

When the pH within the evaporation tank 3 has a certain correlation with the lapse of time of evaporation and concentration, amount of heating, etc., there is the effect that no such detection means of pH of the waste solution or the concentrate as described above is not required to be provided.

As described above, when the pH of the concentrate is maintained at 3.0 to 11.0, the content of the component which can be bad odor in the evaporated gas is small, and therefore even if released, it will be migrated to the liquid side after cooling, whereby there is no sensible bad odor through adequate composition balance between the acidic components and the basic components in the distillate.

For inhibiting effectively bad odor in the present invention, it is preferable to control the heat content supplied from the heater 4 within the evaporation tank 3. More specifically, when the heat content applied per unit time is increased, thiosulfates will be crystallized before decomposition, whereby bad odor can be inhibited without being released externally, while on the contrary if the heat content applied is small, decomposition will be promoted to activate flow-out of the substance which will cause bad odor.

Also, for inhibiting effective;y bad odor in the embodiment (v) of the present invention, it is also preferable to incorporate compounds represented by the following formulae (V) to (VIII) in the waste solution before heating or during heating.

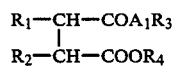  Formula (V)

In the above formula, one of the $R_1$ and $R_2$ represents a hydrogen atom, and the other a group represented by the formula: $—SO_3M$ (M represents a hydrogen atom or a monovalent cation). $A_1$ represents an oxygen atom or a group represented by the formula: $—NR_5—$ ($R_5$ represents a hydrogen atom or an alkyl group having 1 to 8 carbon atoms). $R_3$ and $R_4$ each represent an alkyl group having 4 to 16 carbon atoms, with proviso that the alkyl group represented by $R_3$, $R_4$ or $R_5$ may be substituted with a fluorine atom.

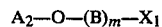  Formula (VI)

In the above formula, $A_2$ represents a monovalent organic group such as an alkyl group having 6 to 20, preferably 6 to 12 carbon atoms (e.g. hexyl, heptyl, octyl, nonyl, decyl, undecyl or dodecyl group), or an aryl group substituted with an alkyl group having 3 to 20 carbon atoms, and as the substituent, there may be included an alkyl group having preferably 3 to 12 carbon atoms (e.g. propyl, butyl, pentyl, hexyl, heptyl, octyl, nonyl, decyl, undecyl or dodecyl group), and as the aryl group, there may be included phenyl, tolyl, xylyl, biphenyl or naphthyl group, preferably phenyl group or totyl group. As the position at which the alkyl group is bonded to the aryl group, it may be either the ortho, meta or para position. B represents ethylene oxide or propylene oxide, and m represents an integer of 4 to 50. $X_1$ represents a hydrogen atom, $SO_3Y$ or $PO_3Y_2$, Y represents a hydrogen atom, an alkali metal atom (Na, K or Li, etc.) or ammonium ion,

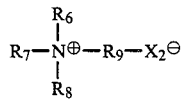   Formula (VII)

In the above formula, $R_6$, $R_7$, $R_8$ and $R_9$ each represent a hydrogen atom, an alkyl group or a phenyl group with proviso that, the total carbon atoms of $R_6$, $R_7$, $R_8$ and $R_9$ are 3 to 50. $X_2^{\ominus}$ represents an anion such as halogen atom, hydroxyl group, sulfate group, carbonate group, nitrate group, acetate group, p-toluenesulfonate group, etc.

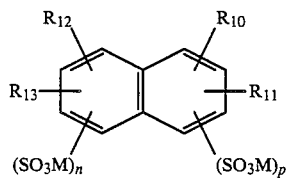   Formula (VIII)

In the above formula, $R_{10}$, $R_{11}$, $R_{12}$ and $R_{13}$ each represent a hydrogen atom or an alkyl group and M is the same as in the formula (V). n and p each represent an integer of 0 or 1 to 4, and values satisfying $1 \leq n+p \leq 8$.

Representative specific examples of the compounds represented by the formulae (V) to (VIII) are shown below.

Compounds represented by the formula (V):

$$\begin{matrix} & C_2H_5 \\ & | \\ CH_2COOCH_2CHC_6H_{13} \\ | \\ CHCOOCH_2CHC_6H_{13} \\ | & | \\ SO_3Na & C_2H_5 \end{matrix}$$ (1)

$$\begin{matrix} & C_4H_9 \\ & | \\ CH_2COOCH_2CHC_4H_9 \\ | \\ CHCOOCH_2CHC_4H_9 \\ | & | \\ SO_3Na & C_4H_9 \end{matrix}$$ (2)

$$\begin{matrix} & C_4H_9 \\ & | \\ CH_2COOCH_2CHC_6H_{13} \\ | \\ CHCOOCH_2CHC_6H_{13} \\ | & | \\ SO_3K & C_4H_9 \end{matrix}$$ (3)

$$\begin{matrix} CH_2CONHC_8H_{17} \\ | \\ CHCOOCH_2CHC_4H_9 \\ | & | \\ SO_3Na & C_2H_5 \end{matrix}$$ (4)

$$\begin{matrix} SO_3Na \\ | \\ CHCONHC_{10}H_{21} \\ | \\ CH_2COOC_{10}H_{21} \end{matrix}$$ (5)

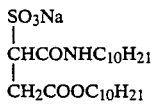 (6)

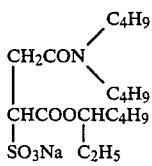 (7)

$$\begin{matrix} CH_2COOC_8H_{17} \\ | \\ CHCOOC_8H_{17} \\ | \\ SO_3Na \end{matrix}$$ (8)

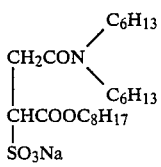 (9)

$$\begin{matrix} CH_2COOCH_2(CF_2CF_2)_3H \\ | \\ CHCOOCH_2(CF_2CF_2)_3H \\ | \\ SO_3Na \end{matrix}$$ (10)

$$\begin{matrix} CH_2COOC_8F_{17} \\ | \\ CHCOOC_8F_{17} \\ | \\ SO_3Na \end{matrix}$$ (11)

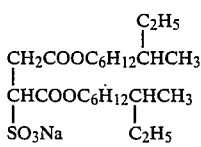 (12)

Compounds represented by the formula (VI)

$C_{12}H_{25}O(C_2H_4O)_{10}H$ (13)

$C_8H_{17}O(C_3H_6O)_{15}H$ (14)

$C_9H_{19}O(C_2H_4O)_4SO_3Na$ (15)

$C_{10}H_{21}O(C_2H_4O)_{15}PO_3Na_2$ (16)

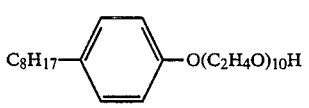 (17)

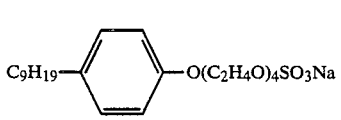 (18)

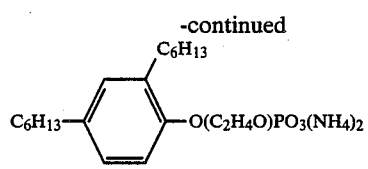 (19)
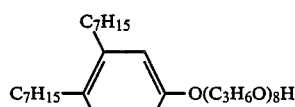 (20)
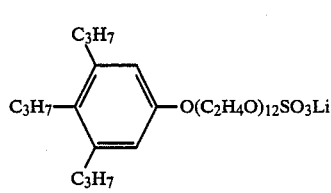 (21)
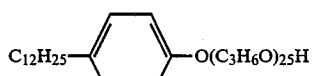 (22)
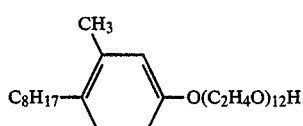 (23)
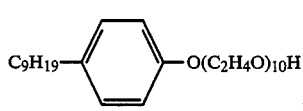 (24)
Compounds represented by the formula (VII)
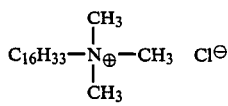 (25)
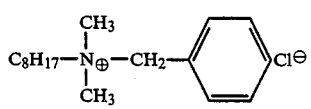 (26)
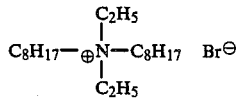 (27)
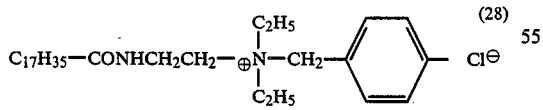 (28)
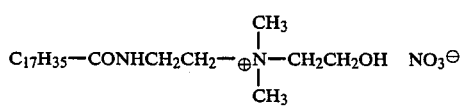 (29)
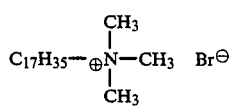 (30)
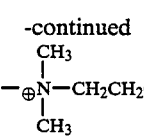 (31)
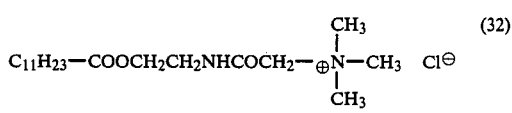 (32)
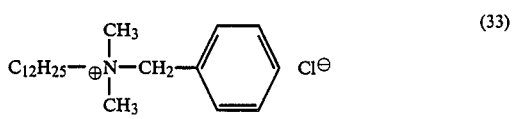 (33)
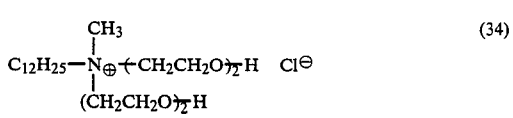 (34)
Compounds represented by the formula (VIII):
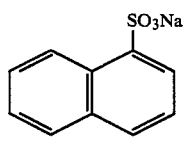 (35)
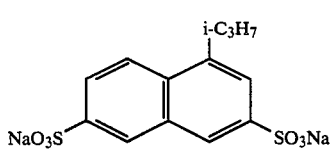 (36)
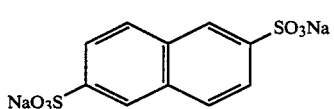 (37)
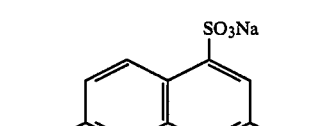 (38)
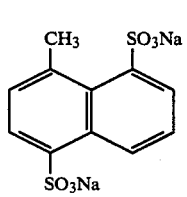 (39)
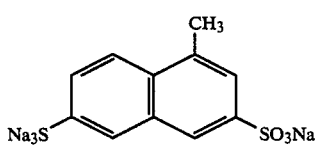 (40)
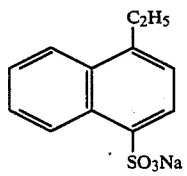 (41)

-continued

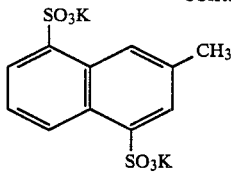
(42)

Having described above about embodiments of the methods for inhibiting bad odor and the device therefor, they are not limitative of the invention, but various embodiments are included within the scope of the present invention. In the following, their main embodiments are shown. As to other embodiments than those shown below, reference can be made to the specifications of the already filed applications (e.g. Japanese Patent Application Nos. 259001/1985 to 259010/1985, Japanese Patent Application No. 132098/1986, Japanese Patent Application No. 165099/1986, Japanese Patent Application No. 165100/1986, etc.).

(1) The present invention acts particularly effectively when thiosulfate ions (e.g. ammonium thiosulfate) are contained in the photographic processing waste solution of the present invention, and the concentration of said thiosulfate ions should be preferably 5 to 500 g/l in the case of ammonium thiosulfate. As the kind of the waste solution, there may be included, for example, mixed waste solutions of color developing solution with bleach-fixing solution or stabilizing solution, or a waste solution such as bleach-fixing solution or fixing solution alone may be included. Also, the present invention can work particularly effectively when silver ions are contained in the waste solution, and its concentration may be preferably within the range of 0.01 to 50 g/l.

Also, in the present invention, it is preferable to apply the method for treatment of a waste solution of small volume such as that obtained from a non-water washing automatic processing machine, etc. Here, a small volume is used as the concept contrasted to waste water in factory of large volume, etc., and while it is not limited particularly in numerical value, it may be, for example, about 1 l/D to 1,000 l/D.

(2) In the present invention, as the means for feeding the waste solution to the evaporation tank 3, there may be included the method for feeding the solution by pump-up from the waste solution tank not shown, the method of feeding by utilizing the head pressure, or otherwise the method of feeding by manual operation.

Also, feeding of the waste solution may be done either continuously or incontinuously, which is determined depending on whether the evaporation treatment is continuous or batchwise.

Further, the waste solution may be fed as liquid, but it may be also fed in spray.

(3) The evaporation tank 3 in the present invention is a tank which reduces the amount of the waste solution to be discarded by heating the waste solution fed to thereby evaporate a part thereof and concentrate the waste solution. In the present specification, concentration means reducing the waste solution volume after evaporation to ¼ or less of the volume before evaporation, preferably 1/5 or less, most preferably 1/10. The present invention is also applicable for the case in which all of the waste solution (including substantially all) was evaporated to dryness.

The form of the evaporation tank 3 is not particularly limited, but it is preferable that it is formed of a double structure of an outer tank (outer kettle) and an inner tank (inner kettle), with the inner tank being, for example, detachably formed with the bag made of resin. Also, at the outer circumference of the evaporation tank 3, a heat insulating material (e.g. glass wool mat) may be preferably provided. At the upper part of the evaporation tank, it is preferable to provide a hinged opening and closing lid.

(4) In the present invention, the heating means is not particularly limited, but a heater heating system is employed as one example in FIG. 1. Heaters may include, for example, electric heating heaters, quartz tube built-in nichrome wire heaters, ceramic heaters, etc., and these may be preferably provided internally of the evaporation tank as shown in the FIG. 1. Other than heaters, it is also possible to employ direct fire or induction heating system such as irradiation of microwave, and these may also be utilized in combination.

Heating by a heater may be stopped by actuation of a timer, but this is not limitative, but the liquid surface of the concentrate may be detected by a level sensor, and heating may be stopped by said detected signal.

(5) In the present invention, the evaporated gas is cooled by use of, for example, a gas cooler 6, but the cooling means may be any desired one, and it is not an essential requirement for accomplishing the object of the present invention to effect compulsory cooling. The case of forming a distillate by natural cooling and discarding the distillate is also included within the scope of the present invention.

In the present invention, after cooling, there is no problem of odor, etc., and yet a distillate containing ammonium salt such as ammonium sulfite, etc. can be obtained, and it can be reutilized as, for example, fertilizer, etc. other than the photographic processing solution (e.g. water for dissolving replenishing solution or washing water) in the automatic processing machine.

(6) The gas after cooling and control in humidity is inhibited in bad odor to almost insensible extent, and for further complete removal of bad odor, it is also preferable to use an adsorbent such as activated charcoal, etc.

By doing so, the present invention is excellent in that there is no problem as in treatment of highly concentrated bad odor gas in the prior art (for example, rapid saturation, cumbersome operations in exchange, etc.), and further the pH controlling means of the present invention can effectively function as the pretreatment for prevention of odor.

EXAMPLE 1

The following experimental examples were carried out by utilizing the photographic processing waste solution shown below.

(Negative film processing)

SR-V100 film (produced by Konishiroku Photo Industry Co., Ltd.) after exposure was applied with continuous processing of negative film by use of the following processing steps and processing solutions.

| Processing step | Processing temperature | Processing time |
| --- | --- | --- |
| Color developing | 38° C. | 3 min. 15 sec. |
| Bleaching | 38° C. | 3 min. 15 sec. |
| Fixing | 38° C. | 3 min. 15 sec. |
| First tank for first stabilization | 32° C.–38° C. | 1 min. |
| Second tank for first | | |

-continued

| Processing step | Processing temperature | Processing time |
|---|---|---|
| stabilization | 32° C.–38° C. | 1 min. |
| Second stabilization | 38° C. | 1 min. |
| Drying | 45° C.–65° C. | |

[Color developing solution]

| | |
|---|---|
| Potassium carbonate | 30 g |
| Sodium hydrogen carbonate | 2.5 g |
| Potassium sulfite | 5 g |
| 1-Hydroxyethylidene-1,1-diphosphonic acid (60%) | 1.0 g |
| Sodium bromide | 1.3 g |
| Potassium iodide | 2 mg |
| Hydroxylamine sulfate | 2.5 g |
| Sodium chloride | 0.6 g |
| 4-Amino-3-methyl-N—ethyl-N—(β-hydroxyethyl)aniline sulfate | 4.8 g |
| Potassium hydroxide | 1.2 g | made up to 1 l with addition of water, and adjusted to pH 10.06 with potassium hydroxide or 20% sulfuric acid.

[Color developing replenishing solution]

| | |
|---|---|
| Potassium carbonate | 40 g |
| Sodium hydrogen carbonate | 3 g |
| Potassium sulfite | 7 g |
| Sodium bromide | 0.9 g |
| 1-Hydroxyethylidene-1,1-diphosphonic acid (60%) | 1.2 g |
| Hydroxylamine sulfate | 3.1 g |
| 4-Amino-3-methyl-N—ethyl-N—(β-hydroxyethyl)aniline sulfate | 6.0 g |
| Potassium hydroxide | 2 g | made up to 1 l with addition of water, and adjusted to pH 10.12 with potassium hydroxide or 20% sulfuric acid.

[Bleaching solution]

| | |
|---|---|
| Iron ammonium ethylenediaminetetraacetate | 160 g |
| Disodium ethylenediaminetetraacetate | 10 g |
| Ammonium bromide | 150 g |
| Glacial acetic acid | 10 ml | made up to 1 l with addition of water, and adjusted to pH 5.8 with ammonia water or glacial acetic acid.

[Bleaching replenishing solution]

| | |
|---|---|
| Iron ammonium ethylenediaminetetraacetate | 170 g |
| Disodium ethylenediaminetetraacetate | 12 g |
| Ammonium bromide | 178 g |
| Glacial acetic acid | 21 ml | made up to 1 l with addition of water, and adjusted to pH 5.6 with ammonia water or glacial acetic acid.

[Fixing solution]

| | |
|---|---|
| Ammonium thiosulfate | 150 g |
| Anhydrous sodium bisulfite | 12 g |
| Sodium metabisulfite | 2.5 g |
| Disodium ethylenediaminetetraacetate | 0.5 g |

-continued

| | |
|---|---|
| Sodium carbonate | 10 g | made up to 1 l with addition of water, and adjusted to pH 7.0 with ammonia water or glacial acetic acid.

[Fixing replenishing solution]

| | |
|---|---|
| Ammonium thiosulfate | 300 g |
| Anhydrous sodium bisulfite | 15 g |
| Sodium metabisulfite | 3 g |
| Disodium ethylenediaminetetraacetate | 0.8 g |
| Sodium carbonate | 14 g | made up to 1 l with addition of water, and adjusted to pH 7.5 with ammonia water or glacial acetic acid.

[First stabilizing solution and first stabilizing replenishing solution]

| | |
|---|---|
| 5-Chloro-2-methyl-4-isothiazoline-3-on | 0.02 g |
| 2-Octyl-4-isothiazoline-3-on | 0.02 g |
| Ethylene glycol | 1.0 g | made up to 1 l with water, and adjusted to pH 7.0 with 20% sulfuric acid.

[Second stabilizing solution and second stabilizing replenishing solution]

| | |
|---|---|
| Formalin (37% aqueous solution) | 2 ml |
| KONIDAX (produced by Konishiroku Photo Industry Co., Ltd.) | 5 ml | made up to 1 l with addition of water.

The color developing replenishing solution was replenished in an amount of 13.5 ml per 100 cm² of color negative film into the color developing bath, the bleaching replenishing solution in an amount of 5.5 ml per 100 cm² of color negative film into the bleaching bath, the fixing replenishing solution in an amount of 8 ml per 100 cm² of color negative film into the fixing bath, and further the first stabilizing replenishing solution in an amount of 8 ml per 100 cm² of color negative film into the first stabilizing bath and the second stabilizing replenishing solution flowed in an amount of 150 ml per 100 cm² of color negative film into the second stabilizing bath.

(Paper processing)

Subsequently, Sakura color-SR paper (produced by Konishiroku Photo Industry Co., Ltd.) after picture printing was applied with continuous processing by use of the following processing steps and processing solutions.

Standard processing step

| | | |
|---|---|---|
| (1) Color developing | 38° C. | 3 min. 30 sec. |
| (2) Bleach-fixing | 38° C. | 1 min. 30 sec. |
| (3) Stabilizing processing | 25° C.–35° C. | 3 min. |
| (4) Drying | 75° C.–100° C. | about 2 min. |

Processing solution compositions

[Color developing tank solution]

| | |
|---|---|
| Benzyl alcohol | 15 ml |
| Ethylene glycol | 15 ml |
| Potassium sulfite | 2.0 g |
| Potassium bromide | 1.3 g |
| Sodium chloride | 0.2 g |
| Potassium carbonate | 24.0 g |
| 3-Methyl-4-amino-N—ethyl-N—($\beta$-methane-sulfonamidoethyl)aniline sulfate | 4.5 g |
| Fluorescent brightener (4,4'-diaminostyl-benedisulfonic acid derivative) (tradename KEICOL PK-CONC, Produced by Shin-nissei Kako Co.) | 1.0 g |
| Hydroxylamine sulfate | 3.0 g |
| 1-Hydroxyethylidene-1,1-diphosphonic acid | 0.4 g |
| Hydroxyethyliminodiacetic acid | 5.0 g |
| Magnesium chloride · 6 hydrate | 0.7 g |
| 1,2-hydroxybenzene-3,5-disulfonic acid-disodium salt | 0.2 g | made up to 1 l with addition of water, adjusted to pH 10.20 with potassium hydroxide and sulfuric acid.

[Color developing replenishing solution]

| | |
|---|---|
| Benzyl alcohol | 20 ml |
| Ethylene glycol | 20 ml |
| Potassium sulfite | 3.0 g |
| Potassium carbonate | 30.0 g |
| Hydroxylamine sulfate | 4.0 g |
| 3-Methyl-4-amino-N—ethyl-N—($\beta$-methane-sulfonamidoethyl)aniline sulfate | 6.0 g |
| Fluorescent brightener (4,4'-diaminostyl-benedisulfonic acid derivative) (tradename KEICOL PK-CONC, Produced by Shin-nissei Kako Co.) | 2.5 g |
| 1-Hydroxyethylidene-1,1-diphosphonic acid | 0.5 g |
| Hydroxyethyliminodiacetic acid | 5.0 g |
| Magnesium chloride · 6 hydrate | 0.8 g |
| 1,2-hydroxybenzene-3,5-disulfonic acid-disodium salt | 0.3 g | made up to 1 l with addition of water, adjusted to pH 10.70 with potassium hydroxide.

[Bleach-fixing tank solution]

| | |
|---|---|
| Ferric ammonium ethylenediamine-tetraacetate dihydrate | 60.0 g |
| Ethylenediaminetetraacetic acid | 3.0 g |
| Ammonium thiosulfate (70% solution) | 100.0 ml |
| Ammonium sulfite (40% solution) | 27.5 ml | the total amount was made up to 1 l with addition of water, and pH was adjusted to 7.1 with potassium carbonate or glacial acetic acid.

[Bleach-fixing replenishing solution A]

| | |
|---|---|
| Ferric ammonium ethylenediamine-tetraacetate dihydrate | 260.0 g |
| Potassium carbonate | 42.0 g | the total amount was made up to 1 l with addition of water.

This solution has a pH of 6.7±0.1.

[Bleach-fixing replenishing solution B]

| | |
|---|---|
| Ammonium thiosulfate (70% solution) | 500.0 ml |
| Ammonium sulfite (40% solution) | 250.0 ml |
| Ethylenediaminetetraacetic acid | 17.0 g |
| Glacial acetic acid | 85.0 ml | the total amount was made up to 1 l with addition of water.

This solution has a pH of 5.3±0.1.

[Washing-substitutive stabilizing tank solution and its replenishing solution]

| | |
|---|---|
| Ethylene glycol | 1.0 g |
| 1-Hydroxyethylidene-1,1-diphosphonic acid (60% aqueous solution) | 1.0 g |
| Ammonia water (25% aqueous ammonium hydroxide solution) | 2.0 g | made up to 1 l with water, and adjusted to pH 7.0 with sulfuric acid.

An automatic processing machine was filled with the above color developing tank solution, the bleach-fixing tank solution and the stabilizing tank solution, and running test was performed while replenishing the color developing replenishing solution, the bleach-fixing replenishing solutions A, B and the stabilizing replenishing solution through quantitating cups every three minutes intervals while processing the above Sakura color-SR paper sample. The replenished amounts were 190 ml as the replenishing amount into the color developing tank, each 50 ml as the replenished amount for the bleach-fixing replenishing solutions A, B into the bleach-fixing tank, 250 ml as the replenished amount for the replenishing solution for washing substitutive stabilizing solution into the stabilizing tank, respectively, per 1 m² of the color paper. The stabilizing tank in the automatic developing machine was made a multi-tank countercurrent system, in which the stabilizing tank comprises the first to the third tank in the direction of the flow of sample, replenishment is conducted from the final tank, the overflowed solution from the final tank is permitted to flow into the tank in the proceeding stage, and further the overflowed solution was permitted to flow into the tank precedent thereto.

Continuous treatment was performed until the total replenished amount of the washing-substitutive stabilizing solution became 3-fold of the stabilizing tank volume.

All of the photographic processing waste solutions produced by the above processing were mixed, and the following treatment was applied thereon.

EXPERIMENTAL EXAMPLE 1

After the above photographic processing waste solution was stored for 5 days, the $SO_3^{2-}$ concentration in the waste solution was quantitatively determined by iodometory to be $4.5 \times 10^{-4}$ gram ion/l. Also, the pH was 8.0. 5 liters of this photographic processing waste solution were received in the device shown in FIG. 1, and evaporation treatment was performed.

Evaporation and concentration were performed to 2.5 l, and the evaporated gas was cooled to obtain a distillate.

When the temperature of the distillate was 25° C., $NH_3$ gas, $H_2S$ gas, $SO_2$ gas on the surface of the distillate were quantitatively determined, and also appearance of the distillates was examined. The results are shown in Table 1.

Next, sodium sulfite was added, and the same experiment was repeated by varying the sulfite ion ($SO_3^{2-}$) concentration in the waste solution as shown in Table 1. The results are also shown in Table 1.

However, here, after initiation of evaporation and concentration, the $SO_3^{2-}$ concentration was controlled to the initial concentration every time after 500 ml was evaporated.

TABLE 1

| No. | $SO_3^{2-}$ concentration in the waste solution (gram ion/l) | $NH_3$ gas (ppm) | $H_2S$ gas (ppm) | $SO_2$ gas (ppm) | Appearance (distillate) |
|---|---|---|---|---|---|
| 1 | $1.5 \times 10^{-4}$ | 500 | 100 | 0 | cloudy (slightly yellowish) |
| 2 | $5 \times 10^{-4}$ | 100 | 40 | 0 | a little turbid |
| 3 | $1 \times 10^{-3}$ | 50 | 30 | 0 | very little turbid |
| 4 | $5 \times 10^{-3}$ | 5 | 0 | 0 | colorless and transparent |
| 5 | $1 \times 10^{-2}$ | 2 | 0 | 0 | colorless and transparent |
| 6 | 0.1 | 0 | 0 | 0 | colorless and transparent |
| 7 | 0.5 | 0 | 0 | 0 | colorless and transparent |
| 8 | 2 | 0 | 0 | 20 | colorless and transparent |
| 9 | 4 | 0 | 0 | 50 | colorless and transparent |
| 10 | 5 | 0 | 0 | 500 | colorless and transparent |

As is apparent from Table 1, when the $SO_3^{2-}$ concentration in the waste solution is within the range of $5 \times 10^{-4}$ to 4 gram ion/l, the distillate will not become turbid, and also $NH_3$ gas, $H_2S$ gas and $SO_2$ gas are preferably small in amount. Above all, when it is within the range of $5 \times 10^{-3}$ gram ion/l to 0.5 gram ion/l, the distillate becomes colorless and transparent, and generation of $NH_3$ gas, $H_2S$ gas and $SO_2$ gas is little.

In contrast, if the $SO_3^{2-}$ concentration in the waste solution is less than $5 \times 10^{-4}$ gram ion/l, $NH_3$ gas and $H_2S$ gas will be remarkably generated with the distillate becoming turbid, and if it exceeds 4 gram ion/l, $SO_2$ gas will be generated remarkably.

EXPERIMENTAL EXAMPLE 2

After 100 g of the compound indicated in Table 2 was added to 5 l of the waste solution after storage with lapse of time employed in Experimental example 1, the pH was adjusted to 8.0 with $H_2SO_4$ and NaOH, and after concentration to 2.5 l in the evaporation tank, $NH_3$ gas, $H_2S$ gas and $SO_2$ gas were quantitatively determined similarly as in Experimental example 1, simultaneously with examination of appearance of the distillate. After concentration, the compounds in the respective concentrates were quantitatively determined to find that they all existed in amounts of 5 g/l or more. The results are shown in Table 2.

TABLE 2

| No. | Compound capable of releasing sulfite ions | $NH_3$ gas (ppm) | $H_2S$ gas (ppm) | $SO_2$ gas (ppm) | Appearance (distillate) |
|---|---|---|---|---|---|
| 11 | I - (1) | 0 | 0 | 0 | colorless and transparent |
| 12 | I - (2) | 1 | 0 | 0 | colorless and transparent |
| 13 | I - (3) | 3 | 2 | 0 | colorless and transparent |
| 14 | I - (4) | 1 | 2 | 2 | colorless and transparent |
| 15 | I - (5) | 2 | 1 | 0 | colorless and transparent |
| 16 | II - (1) | 1 | 2 | 0 | colorless and transparent |
| 17 | II - (2) | 0 | 0 | 0 | colorless and transparent |
| 18 | II - (3) | 1 | 0 | 2 | colorless and transparent |
| 19 | II - (4) | 2 | 1 | 3 | colorless and transparent |
| 20 | A - (1) | 0 | 0 | 0 | colorless and transparent |
| 21 | A - (2) | 2 | 2 | 1 | colorless and transparent |
| 22 | A - (7) | 3 | 2 | 1 | colorless and transparent |

As is apparent from Table 2, even when the compound capable of releasing sulfite ions of the present invention may be used, substantially the same effect as in the case of sodium sulfite used in Experimental example 1 could be obtained.

EXPERIMENTAL EXAMPLE 3

The pH of the waste solution No. 1 stored with lapse of timed used in Experimental example 1 and the waste solution No. 23 added with 20 g/l of potassium bisulfite was adjusted with $H_2SO_4$ and KOH as shown in Table 3. Evaporation was initiated, and pH was adjusted as shown in Table 1 every time when 500 ml was evaporated. Evaporation and concentration were performed to 2.5 l, and the evaporated gas was cooled to obtain a distillate, which was evaluated similarly as in Experimental example 1. The $SO_3^{2-}$ concentration in the evaporation tank after completion of the experiment was found to be all $5 \times 10^{-3}$ gram ion/l or more.

TABLE 3

| No. | pH of waste solution | $NH_3$ gas (ppm) | $H_2S$ gas (ppm) | $SO_2$ gas (ppm) | Appearance (distillate) |
|---|---|---|---|---|---|
|  | 2.0 | 0 | 150 | 2 | cloudy (slightly yellowish) |
|  | 3.0 | 0 | 100 | 0 | turbid |
|  | 4.0 | 0 | 50 | 0 | a little turbid |
|  | 5.0 | 5 | 10 | 0 | very little turbid |
| 1 | 6.0 | 50 | 5 | 0 | colorless and transparent |
|  | 7.0 | 100 | 0 | 0 | colorless and transparent |
|  | 8.0 | 500 | 0 | 0 | colorless and transparent |
|  | 9.5 | 500 | 0 | 0 | very thin yellow |
|  | 11.0 | 500 | 0 | 0 | thin yellow |
|  | 12.0 | 800 | 0 | 0 | yellow |
|  | 2.0 | 0 | 30 | 500 | turbid |
|  | 3.0 | 0 | 20 | 100 | a little turbid |
|  | 4.0 | 0 | 10 | 50 | very little turbid |
|  | 5.0 | 0 | 0 | 2 | colorless and transparent |
| 23 | 6.0 | 2 | 0 | 0 | colorless and transparent |

TABLE 3-continued

| No. | pH of waste solution | NH$_3$ gas (ppm) | H$_2$S gas (ppm) | SO$_2$ gas (ppm) | Appearance (distillate) |
|---|---|---|---|---|---|
| | 7.0 | 20 | 0 | 0 | colorless and transparent |
| | 8.0 | 100 | 0 | 0 | colorless and transparent |
| | 9.5 | 200 | 0 | 0 | very thin yellow |
| | 11.0 | 300 | 0 | 0 | thin yellow |
| | 12.0 | 500 | 0 | 0 | yellow | prepare waste solutions of No. 29 to 33, which were similarly adjusted to pH 2.0, 6.0 and 12.0.

Each 5 l of all of the above waste solutions was received in the device shown in FIG. 1, and evaporation concentration was performed to 2.0 l. Also, the pH was corrected to the initial value every time when 500 ml was evaporated.

The sulfite ion concentrations in the waste solutions of No. 29 to 33 after evaporation concentration were found to be $7.94 \times 10^{-3}$ gram ion/l or more.

The results are shown in Table 4.

TABLE 4

| | Concentration of sulfite ions $4.5 \times 1^{-4}$ gram ion/l or less | | | | | Initial concentration of sulfite ions $7.94 \times 10^{-2}$ gram ion/l | | | | |
|---|---|---|---|---|---|---|---|---|---|---|
| pH | No. | NH$_3$ or amine gas (ppm) | H$_2$S gas (ppm) | SO$_2$ gas (ppm) | Appearance (distillate) | No. | NH$_3$ or amine gas (ppm) | H$_2$S gas (ppm) | SO$_2$ gas (ppm) | Appearance (distillate) |
| 2.0 | | 0 | 0 | 0 | very little yellow | | 0 | 0 | 100 | very little yellow |
| 6.0 | 24 | 2 | 0 | 0 | colorless and transparent | 29 | 0 | 0 | 0 | colorless and transparent |
| 12.0 | | 5 | 0 | 0 | yellow | | 0 | 0 | 0 | yellow |
| 2.0 | | 1 | 0 | 0 | very little yellow | | 0 | 0 | 100 | very little yellow |
| 6.0 | 25 | 10 | 0 | 0 | colorless and transparent | 30 | 5 | 0 | 0 | colorless and transparent |
| 12.0 | | 100 | 0 | 0 | yellow | | 50 | 0 | 0 | yellow |
| 2.0 | | 2 | 200 | 0 | a little cloudy | | 0 | 40 | 100 | a little cloudy |
| 6.0 | 26 | 100 | 10 | 0 | colorless and transparent | 31 | 5 | 1 | 0 | colorless and transparent |
| 12.0 | | 800 | 0 | 0 | yellow | | 600 | 0 | 0 | yellow |
| 2.0 | | 2 | 200 | 0 | cloudy (a little yellowish) | | 0 | 30 | 100 | cloudy (a little yellowish) |
| 6.0 | 27 | 100 | 10 | 0 | colorless and transparent | 32 | 2 | 0 | 0 | colorless and transparent |
| 12.0 | | 800 | 0 | 0 | yellow | | 500 | 0 | 0 | yellow |
| 2.0 | | 2 | 200 | 0 | cloudy (a little yellowish) | | 0 | 30 | 100 | cloudy (a little yellowish) |
| 6.0 | 28 | 100 | 10 | 0 | colorless and transparent | 33 | 2 | 0 | 0 | colorless and transparent |
| 12.0 | | 800 | 0 | 0 | yellow | | 500 | 0 | 0 | yellow |

As is apparent from Table 3, by addition of sulfite ions ($SO_3^{2-}$), generation of NH$_3$ gas, H$_2$S gas and SO$_2$ gas is little, and also generation of turbidity of the distillate is little, but it can be understood that good results are obtained particularly in the range of pH 3.0 to 11.0.

EXPERIMENTAL EXAMPLE 4

The color developing waste solution No. 24 containing no thiosulfate was adjusted to pH 2.0, 6.0 and 12.0 with H$_2$SO$_4$ and NaOH, and similarly the waste solution No. 25 having added a bleaching waste solution containing no thiosulfate added into the color developing waste solution was similarly adjusted in pH.

Also, the waste solution No. 26 having added 50 g/l of ammonium thiosulfate into the waste solution of No. 25 was similarly adjusted in pH, and the waste solution No. 27 having added 50 g/l of ammonium thiosulfate and 5 g/l of AgBr into the waste solution of No. 25 and the waste solution No. 28 having added 30% volume of the fixing waste solution into the waste solution of No. 25 were similarly adjusted in pH.

When these waste solutions were stored for 1 week and the sulfite ion concentrations in the waste solutions were measured, all were found to be less than $4.5 \times 10^{-4}$ gram ion/l.

Next, 10 g/l of sodium sulfite was added into the waste solutions stored with lapse of time No. 24 to 28 to As is apparent from Table 4, the waste solution containing sulfite ions is small in bad odor in all of the cases, and particularly H$_2$S gas which is readily generated by containment of thiosulfate ions can be well prevented by sulfite ions. Particularly, in the waste solutions with pH 6.0 of waste solutions No. 32 and 33 containing silver, H$_2$S gas is completely prevented.

EXPERIMENTAL EXAMPLE 5

The above photographic processing waste solution in an amount of 5 l was received in the device shown in FIG. 2, and evaporation treatment was performed.

As the catalyst, carried Pd was employed, and by varying the contact temperature as in Table 5, the concentrations of NH$_3$ and NO$_2$ in the gas on the surface of the distillate were measured. The results are shown in Table 5.

TABLE 5

| Temperature (°C.) | 10 | 20 | 50 | 120 | 200 | 250 | 350 | 400 | 500 |
|---|---|---|---|---|---|---|---|---|---|
| NH$_3$ (ppm) | 600 | 1.0 | 0.5 | 0.1 | 0.1 | 0.1 | 0.5 | 0.5 | 0.5 |
| NO$_2$ (ppm) | 0 | 0 | 0 | 0 | 0 | 0 | 0.1 | 10 | 50 |

As is apparent from Table 5, it can be understood that the ammonia odor was gradually reduced as the temperature becomes 20° C. or higher, 50° C. or higher and 120° C. or higher. On the other hand, it can be also understood that $NO_2$ is reduced as the temperature becomes 400° C. or lower, 350° C. or lower and 250° C. or lower. Particularly, it has been found that there is substantially no odor when contact if effected in the range of 120° to 250° C.

EXPERIMENTAL EXAMPLE 6

When the same experiment as in Experimental example 5 was conducted by changing the catalyst to carried Pt, carried Rh, carried Ir, carried Fe, carried Co, carried Ni, carried Ru, carried Os, carried Cu, carried Zn and carried Mn, the same results as in Experimental example 5 were obtained for the catalysts of carried Pt, carried Rh and carried Ir, but ammonia removal performance was slightly inferior for carried Fe, carried Co, carried Ni, carried Ru, carried Os, carried Cu, carried Zn and carried Mn.

EXPERIMENTAL EXAMPLE 7

The waste solution used in Experimental example 5 was adjusted to pH shown in Table 6 before initiation of heating. As the pH controlling agent, $H_2SO_4$ and KOH were employed.

Evaporation and concentration were initiated, and the evaporated gas was cooled and then passed through a carried Pd catalyst. The catalyst temperature was made 200° C.

The $NH_3$ concentration after passage through the catalyst and the $NH_3$ concentration and amine odor after passage were measured. The measurement results are shown in Table 6. Amine odor was measured according to the organoleptic test by 10 monitor members. In Table 6, "−" indicates that the member who felt the odor was 0, "±" 1 to 2, "+" 3 to 5, "++" 6 or more, respectively.

TABLE 6

| pH of waste solution | 2 | 3 | 4 | 5 | 7 | 9 | 10 | 13 | 14 |
|---|---|---|---|---|---|---|---|---|---|
| $NH_3$ before passing (ppm) | 60 | 100 | 150 | 200 | 500 | 1000 | 2000 | 4000 | 6000 |
| $NH_3$ after passing (ppm) | 40 | 30 | 20 | 0.1 | 0.1 | 0.1 | 0.1 | 0.1 | 0.1 |
| Amine odor | − | − | − | − | − | − | − | ± | + |

As is apparent from Table 6, it can be appreciated that epoch-making effects can be obtained such that the odor of $NH_3$ and amine is reduced at the waste solution pH of 3 to 14, the odor of $NH_3$ and amine is more reduced at pH 5 to 13, and the odor of $NH_3$ and amine is lost at pH 5 to 10.

EXPERIMENTAL EXAMPLE 8

When the same experiment as in Experimental example 7 was conducted by changing the catalyst to carried Pt, carried Rh, carried Ir, carried Fe, carried Co, carried Ni, carried Ru, carried Os, carried Cu, carried Zn and carried Mn, the same results as in Experimental example 7 were obtained for carried Pt, carried Rh and carried Ir, but ammonia removal performance was slightly inferior for carried Fe, carried Co, carried Ni, carried Ru, carried Os, carried Cu, carried Zn and carried Mn.

EXPERIMENTAL EXAMPLE 9

Comparison was made between the case in which the evaporated gas obtained by the evaporation treatment of the waste solution used in Experimental example 5 was contacted with the carried Pd catalyst after cooling and the case in which it was contacted with the carried Pd catalyst before cooling. The catalyst temperature was made 200° C.

When $NH_3$ concentration in the dry gas on the surface of the distillate was measured, the results shown in Table 7 were obtained. The concentration before the passage of the catalyst was 2,000 ppm.

TABLE 7

| | Passage of catalyst before gas cooler | Passage of catalyst after gas cooler |
|---|---|---|
| $NH_3$ odor in the gas on the surface of the distillate (ppm) | 10 | 0.1 |

As is apparent from Table 7, under the state containing water vapor before cooling, $NH_3$ slightly remains, probably because the catalyst activity is slightly inferior. Accordingly, it is preferable to deodorize the gas after removal of water vapor by condensation.

EXPERIMENTAL EXAMPLE 10

The above photographic processing solution in an amount of 5 l was received in the device shown in FIG. 3, and evaporation treatment was performed.

To the photographic processing waste solution, 10 g/l of water-soluble polymer indicated in Table 8 was added. In the table, PVA means polyvinyl alcohol and PVP polyvinyl pyrrolidone.

The waste solution in the evaporation tank was adjusted to pH 6 with $H_2SO_4$ and KOH before initiation of heating.

Evaporation and concentration were effected to 500 ml, and the evaporated gas was cooled to obtain a distillate.

The concentrations of $H_2S$ gas and $NH_3$ gas in the gas on the surface of distillate were measured. The results are shown in Table 8.

TABLE 8

| Concentration of the gas on the surface of the distillate | No additive | Polyethylene n = 600 | PVA n = 1400 | Isobutylene-maleic anhydride copolymer n = 500 | PVP n = 100 | Gelatine n = 330 | Hydroxyethyl cellulose n = 500 | Polyethylene imine n = 1000 |
|---|---|---|---|---|---|---|---|---|
| $N_2S$ (ppm) | 6 | 7 | 0.1 | 0.1 | 0.2 | 0.1 | 0.1 | 0.1 |

TABLE 8-continued

| Concentration of the gas on the surface of the distillate | No additive | Poly-ethylene n = 600 | PVA n = 1400 | Isobutylene-maleic anhydride copolymer n = 500 | PVP n = 100 | Gelatine n = 330 | Hydroxy-ethyl cellulose n = 500 | Poly-ethylene imine n = 1000 |
|---|---|---|---|---|---|---|---|---|
| $NH_3$ (ppm) | 600 | 700 | 50 | 10 | 100 | 20 | 40 | 30 |

(n = average polymerization degree)

As is apparent from Table 8, it can be understood that the inhibiting effect of bad odor can be seen when the water-soluble polymer of the present invention is used. In contrast, when no such polymer was added and when polymers outside of the present invention are added, there is no such bad odor effect.

EXPERIMENTAL EXAMPLE 11

The experiment in Experimental example 10 was repeated by use of PVA with different polymerization degrees. The results are shown on Table 9.

TABLE 9

| Concentration of the gas on the surface of the distillate | Average polymerization degree | | | | | | | | |
|---|---|---|---|---|---|---|---|---|---|
| | 5 | 30 | 100 | 200 | 1000 | 3000 | 5000 | 10000 | 15000 |
| $N_2S$ (ppm) | 6 | 3 | 2 | 0.5 | 0.1 | 0.1 | 2 | 3 | 5 |
| $NH_3$ (ppm) | 600 | 300 | 100 | 50 | 50 | 50 | 100 | 200 | 600 |

As is apparent from Table 9, it can be understood that among PVA, those having 30 to 10,000 polymerization degrees are particularly excellent in the inhibiting effect of bad odor.

EXPERIMENTAL EXAMPLE 12

When gelatin, hydroxyethyl celullose, isobutylene-maleic anhydride copolymer and polyvinyl pyrrolidone were used in place of PVA used in Experimental example 11, the same results as in Experimental example 11 were obtained.

EXPERIMENTAL EXAMPLE 13

In carrying out the same experiment as in Experimental example 10, the pH of the waste solution before initiation of evaporation was varied. As the result, for those with pH 3 to 11, the reduction effect of the $H_2S$ concentration at the upper portion of the distillate was obtained. At pH 5 or less, the amount of $H_2S$ was slightly elevated, and further increased at pH 4 or less.

On the other hand, for ammonia odor, the effect was obtained within the range of pH 3 to 11, but ammonia at the upper portion of the distillate was slightly elevated at pH 7 or less, and further slightly elevated at pH 8 or more.

EXPERIMENTAL EXAMPLE 14

When thiosulfate ions were removed from the waste solution used in Experimental example 10, the amount of $H_2S$ generated was found to be lowered. Also, it was found that it is more effective to use a water-soluble polymer when thiosulfate is contained. Further, for silver ions, the same effect as in the case of thiosulfate ions was obtained.

EXPERIMENTAL EXAMPLE 15

The above photographic processing waste solution in amount of 5 l (waste solution No. 34) was received in the device shown in FIG. 4, and evaporation treatment was performed.

Evaporation and concentration were effected to 2.5 l, and the evaporated gas was cooled to obtain a distillate.

When the temperature of the distillate was 25° C., $NH_3$ gas, $H_2S$ gas and $SO_2$ gas in the gas on the surface of the distillate were quantitatively determined and also appearance of the distillate was examined. The results are shown in Table 10.

Next, each 5 l of the waste solutions No. 35 to 43 added with 10 g/l of various oxidizing agents shown in Table 10 were prepared, and the same experiment was repeated. The results are also shown in Table 10.

TABLE 10

| Waste solution No. | Oxydizing agent | $NH_3$ gas (ppm) | $H_2S$ gas (ppm) | Appearance (distillate) | Remarks |
|---|---|---|---|---|---|
| 34 | None | 100 | 30 | a little turbid | Comp. example |
| 35 | Potassium persulfate | 5 | 0 | colorless and transparent | |
| 36 | Potassium peroxomonosulfate | 5 | 0 | colorless and transparent | |
| 37 | Hydrogen peroxide | 5 | 0 | colorless and transparent | |
| 38 | Sodium persulfate | 5 | 0 | colorless and transparent | This invention |
| 39 | Sodium perborate | 10 | 2 | colorless and transparent | |
| 40 | Potassium bromate | 15 | 5 | colorless and transparent | |
| 41 | Sodium perchlorate | 10 | 2 | colorless and transparent | |
| 42 | Manganese dioxide | 15 | 5 | colorless and transparent | |
| 43 | $Fe_3O_4$ | 10 | 2 | colorless and transparent | |

As is apparent from Table 10, in the waste solution No. 34 for comparison in which no oxidizing agent of the present invention is added, not only $NH_3$ gas and $H_2S$ gas concentrations are high, but the distillate is remarkably turbid. In contast, when the oxidizing agent of the present invention is added, the distillate becomes colorless and transparent, with little generation of NH₃ gas and H₂S gas.

Particularly, it can be appreciated that Nos. 35 to 39 added with peroxide oxidizing agents exhibit particularly good results.

EXPERIMENTAL EXAMPLE 16

The waste solution No. 34 stored with lapse of time used in Experimental example 15, and further the waste liquor No. 44 added with 20 g/l of potassium persulfate were adjusted in pH with $H_2SO_4$ and KOH as shown in Table 11. Evaporation was initiated, and the pH was adjusted as shown in Table 11 every time when 500 ml was evaporated. Evaporation and concentration were effected to 2.0 l, and the evaporated gas was cooled to obtain a distillate, which was evaluated similarly as in Experimental example 15.

TABLE 11

| No. | pH of waste solution | NH₃ gas (ppm) | H₂S gas (ppm) | Appearance (distillate) |
|---|---|---|---|---|
|    | 2.0 | 0 | 200 | cloudy (a little yellowish) |
|    | 3.0 | 0 | 150 | turbid |
|    | 4.0 | 0 | 50 | a little turbid |
|    | 5.0 | 10 | 30 | very little turbid |
| 34 | 6.0 | 100 | 25 | colorless and transparent |
|    | 7.0 | 200 | 0 | colorless and transparent |
|    | 8.0 | 500 | 0 | colorless and transparent |
|    | 9.5 | 500 | 0 | very thin yellow |
|    | 11.0 | 500 | 0 | thin yellow |
|    | 12.0 | 800 | 0 | yellow |
|    | 2.0 | 0 | 5 | turbid |
|    | 3.0 | 0 | 0 | a little turbid |
|    | 4.0 | 0 | 0 | very little turbid |
|    | 5.0 | 0 | 0 | colorless and transparent |
| 44 | 6.0 | 0 | 0 | colorless and transparent |
|    | 7.0 | 0 | 0 | colorless and transparent |
|    | 8.0 | 5 | 0 | colorless and transparent |
|    | 9.5 | 20 | 0 | very thin yellow |
|    | 11.0 | 50 | 0 | thin yellow |

TABLE 11-continued

| No. | pH of waste solution | NH₃ gas (ppm) | H₂S gas (ppm) | Appearance (distillate) |
|---|---|---|---|---|
|    | 12.0 | 100 | 0 | yellow |

As is apparent from Table 11, by addition of potassium persulfate, it can be appreciated that generation of NH₃ gas and particularly toxic H₂S gas is small, and generation of turbidity in the distillate is also small, and particularly good results are obtained in the range of pH 3.0 to 11.0.

EXPERIMENTAL EXAMPLE 17

There were prepared waste solutions controlled to pH 2.0, 6.0 and 12.0 with $H_2SO_4$ and NaOH of the waste solution No. 45 for comparative purpose added with 30 vol. % of color developing waste solution into the bleaching waste solution; waste solutions similarly adjusted in pH of the waste solution No. 46 added with 50 g/l of ammonium thiosulfate into the waste solution of No. 45; waste solutions adjusted similarly in pH of the waste solution No. 47 added with 50 g/l of ammonium thiosulfate and 5 g/l of AgBr into the waste solution of No. 45; and the waste solutions adjusted similarly in pH of the waste solution No. 48 added with 30 vol. % of fixing waste solution into the waste solution of No. 45.

Next, waste solutions No. 49 to 52 having added 10 g/l of potassium peroxomonosulfate into these waste solutions of No. 45 to 48 were prepared, and similarly adjusted in pH.

All of the above waste solutions were received each in 5 l in the device shown in FIG. 4, and evaporation concentration was performed. The results are shown in Table 12. However, pH control was effected every time when 500 ml was evaporated, and concentration was effected to 1.5 l.

TABLE 12

| | No oxidizing agent | | | | | Initial potassium peroxomonosulfite 10 g/l | | | |
|---|---|---|---|---|---|---|---|---|---|
| pH | No. | NH₃ or amine gas (ppm) | H₂S gas (ppm) | Appearance (distillate) | | No. | NH₃ or amine gas (ppm) | H₂S gas (ppm) | Appearance (distillate) |
| 2.0 |    | 1 | 0 | very little yellow | |    | 0 | 0 | very little yellow |
| 6.0 | 45 | 20 | 0 | colorless and transparent | | 49 | 20 | 0 | colorless and transparent |
| 12.0 |    | 200 | 0 | yellow | |    | 200 | 0 | yellow |
| 2.0 |    | 2 | 300 | a little cloudy | |    | 0 | 20 | very little turbid |
| 6.0 | 46 | 150 | 10 | colorless and transparent | | 50 | 10 | 1 | colorless and transparent |
| 12.0 |    | 800 | 0 | yellow | |    | 200 | 0 | yellow |
| 2.0 |    | 2 | 300 | cloudy (a little yellowish) | |    | 0 | 20 | colorless and transparent |
| 6.0 | 47 | 150 | 30 | colorless and transparent | | 51 | 5 | 0 | colorless and transparent |
| 12.0 |    | 800 | 0 | yellow | |    | 200 | 0 | yellow |
| 2.0 |    | 2 | 300 | cloudy (a little yellowish) | |    | 0 | 20 | colorless and transparent |
| 6.0 | 48 | 150 | 30 | colorless and transparent | | 52 | 5 | 0 | colorless and transparent |
| 12 |    | 800 | 0 | yellow | |    | 200 | 0 | yellow |

As is apparent from Table 12, the waste solutions containing potassium peroxomonosulfate are little in bad odor in all of the cases, particularly preventing effectively H₂S gas which is liable to be generated by containment of thiosulfate ions, and particularly H₂S gas is completely prevented in the waste solutions controlled to pH 6.0 among the waste solutions No. 51 and 52 containing silver.

EXPERIMENTAL EXAMPLE 18

5 l of the photographic processing waste solution was placed in the device shown in FIG. 5 and evaporation treatment was carried out.

The pH of the photographic processing waste solution was adjusted to as shown in Table 13 before initiation of heating respectively. As a pH controlling agent, $H_2SO_4$ and KOH were employed. Evaporation and concentration were initiated, pH was adjusted as shown in Table 13 every time when 100 ml was evaporated. Evaporation and concentration were performed to 2.5 l, and the evaporated gas was cooled to obtain a distillate.

When the temperature of the distillate was 25° C., $NH_3$ gas and $H_2S$ gas on the surface of the distillate were quantitatively determined, and also appearance of the distillates was examined. The results are shown in Table 13.

TABLE 13

| PH of waste solution | $NH_3$ gas (ppm) | $H_2S$ gass (ppm) | Appearance (distillate) |
|---|---|---|---|
| 2.0 | 0 | 60 | cloudy (a little yellowish) |
| 3.0 | 0 | 40 | a little turbid |
| 4.0 | 0 | 30 | very little turbid |
| 5.0 | 0 | 5 | colorless and transparent |
| 6.0 | 20 | 0 | colorless and transparent |
| 7.0 | 60 | 0 | colorless and transparent |
| 8.0 | 500 | 0 | colorless and transparent |
| 9.5 | 500 | 0 | very thin yellow |
| 11.0 | 500 | 0 | thin yellow |
| 12.0 | 500 | 0 | yellow |

As is apparent from Table 13, when the pH of the waste solution is within the range of 3.0 to 11.0, the distillate will not preferably become turbid and will not completely become yellow, and further in the range of 4.0 to 8.0, the distillate preferably becomes colorless and transparent and little turbid. Particularly, in the range of 5.0 to 7.0, the distillate becomes colorless and transparent and small in the concentration of $NH_3$ gas and $H_2S$ gas.

On the contrary, when the pH is in the range of outside of 3.0 to 11.0, the concentration of $NH_3$ gas and $H_2S$ gas are high with the distillate becoming turbid and yellowish.

EXPERIMENTAL EXAMPLE 19

After 100 g of the buffering agent indicated in Table 14 was added to 5 l of the waste solution employed in Experimental example 18, the pH was adjusted to 6.5 with $H_2SO_4$ and NaOH, and after concentration to 2.5 l in the evaporation tank, pH was measured. The concentrated waste solution was further concentrated until the distillate becomes turbid and bad odor is generated (at the point that two of five monitors feel bad odor).

TABLE 14

| Sample No. | Kind of buffering agent | pH value | Concentration degree the generation of turbid and bad odor initiated |
|---|---|---|---|
| 53 | Sodium bicarbonate | 5.5 | 1/7 concentration |

TABLE 14-continued

| Sample No. | Kind of buffering agent | pH value | Concentration degree the generation of turbid and bad odor initiated |
|---|---|---|---|
| 54 | Sodium monophosphate | 5.3 | 1/5 concentration |
| 55 | Boric acid | 5.3 | 1/5 concentration |
| 56 | Calcium carbonate | 5.8 | 1/10 concentration |
| 57 | Calcium chloride | 5.5 | 1/7 concentration |
| 58 | Magnesium chloride | 5.5 | 1/7 concentration |
| 59 | Aluminum sulfate | 5.8 | 1/10 concentration |
| 60 | Barium chloride | 5.7 | 1/7 concentration |
| 61 | Potassium chloride | 5.1 | 1/3 concentration |
| 62 | Ethylenediamine-tetraacetate | 5.3 | 1/5 concentration |
| 63 | Nitrilotriacetate | 5.3 | 1/5 concentration |
| 64 | 1-hydroxyethylidene-1,1-diphosphonate | 5.3 | 1/5 concentration |

As is apparent from Table 14, as the pH value becomes nearer to 6.5, the variation of pH becomes preferably smaller. Also, Sample Nos. 56 and 59 of which their pH value after concentration is nearer to 6.5 as compared with the others did not generate bad odor until the concentration degree becomes 1/10 to obtain good results.

EXPERIMENTAL EXAMPLE 20

There were prepared waste solution of Sample No. 65 not containing thiosulfate into the color developing waste solution; waste solution of Sample No. 66 added with 30 volume % of bleaching waste solution similarly not containing thiosulfate into the color developing waste solution; waste solution of Sample No. 67 added with 50 g/l of ammonium thiosulfate into the waste solution of Sample No. 66; waste solution of Sample No. 68 added with 50 g/l of ammonium thiosulfate and 5 g/l AgBr into the waste solution of Sample No. 66; and waste solution of Sample No. 69 added with 30 volume % of the fixing solution into the waste solution of Sample No. 66.

The pH of each 5 l of the above waste solutions were adjusted to 2.0, 6.0 and 12.0 with $H_2SO_4$ and NaOH to and these solutions were evaporated and concentrated.

TABLE 15

| Sample No. | pH | $NH_3$ gas (ppm) | $H_2S$ gas (ppm) | Appearance (distillate) |
|---|---|---|---|---|
| 65 | 2.0 | 0 | 0 | very slightly yellowish |
|  | 6.0 | 0 | 0 | colorless and transparent |
|  | 12.0 | 0 | 0 | yellow |
| 66 | 2.0 | 0 | 0 | very slightly yellowish |
|  | 6.0 | 20 | 0 | colorless and transparent |
|  | 12.0 | 500 | 0 | yellow |
| 67 | 2.0 | 0 | 30 | a little cloudy |
|  | 6.0 | 20 | 3 | colorless and transparent |
|  | 12.0 | 500 | 0 | yellow |
| 68 | 2.0 | 0 | 60 | cloudy (a little yellowish) |
|  | 6.0 | 20 | 0 | colorless and transparent |
|  | 12.0 | 500 | 0 | yellow |
| 69 | 2.0 | 0 | 60 | cloudy (a little yellowish) |
|  | 6.0 | 20 | 0 | colorless and transparent |
|  | 12.0 | 500 | 0 | yellow |

As is apparent from Table 15, it is found that Sample Nos. 67 to 69 containing thiosulfate in the waste solution can exhibit great effect against the generation of bad odor gas and turbid of the distillate. In particular, it is observed that Sample Nos. 68 and 69 containing silver therein can exhibit remarkable effects.

EXPERIMENTAL EXAMPLE 21

The waste solution employed in Experimental example 18 was added with 5 g/l of a surface active agent represented by formulae (V) to (VIII) as shown in Table 16 and treated by concentration treatment as shown in FIG. 5. The concentration of $SO_3^{2-}$ and $NH_4^-$ thereof were measured. The results are shown in Table 16.

TABLE 16

| Added compound No. | pH of waste solution | | | | | |
|---|---|---|---|---|---|---|
| | pH 5.0 | | pH 7.0 | | pH 9.0 | |
| | $SO_3^{2-}$ (g/l) | $NH_4^-$ (g/l) | $SO_3^{2-}$ (g/l) | $NH_4^-$ (g/l) | $SO_3^{2-}$ (g/l) | $NH_4^-$ (g/l) |
| None | 5.4 | 0.4 | 0.3 | 4.2 | 0 | 20 |
| 1 | 4.1 | 0.3 | 0.2 | 3.1 | 0 | 12 |
| 6 | 3.9 | 0.3 | 0.2 | 3.0 | 0 | 12 |
| 10 | 4.0 | 0.3 | 0.2 | 3.2 | 0 | 13 |
| 12 | 4.3 | 0.3 | 0.2 | 3.3 | 0 | 14 |
| 13 | 3.9 | 0.3 | 0.2 | 3.1 | 0 | 12 |
| 16 | 3.9 | 0.3 | 0.2 | 3.0 | 0 | 12 |
| 17 | 3.7 | 0.3 | 0.2 | 3.0 | 0 | 11 |
| 18 | 4.1 | 0.3 | 0.2 | 3.3 | 0 | 13 |
| 20 | 4.2 | 0.3 | 0.2 | 3.4 | 0 | 14 |
| 23 | 4.1 | 0.3 | 0.2 | 3.3 | 0 | 13 |
| 25 | 4.0 | 0.3 | 0.2 | 3.3 | 0 | 13 |
| 26 | 4.0 | 0.3 | 0.2 | 3.1 | 0 | 12 |
| 29 | 3.8 | 0.3 | 0.2 | 3.1 | 0 | 12 |
| 32 | 4.0 | 0.3 | 0.2 | 3.2 | 0 | 13 |
| 35 | 3.9 | 0.3 | 0.2 | 3.1 | 0 | 12 |
| 38 | 3.7 | 0.3 | 0.2 | 3.0 | 0 | 11 |
| 40 | 3.9 | 0.3 | 0.2 | 3.2 | 0 | 12 |
| 42 | 4.3 | 0.3 | 0.2 | 3.4 | 0 | 13 |

As is apparent from Table 16, influent of ammonium sulfite into the distillate is preferably lowered by adding the surface active agent.

Also, as to oder, those using surface active agent are so lowered in the generation of bad odor that only one of five monitors feels bad odor.

EXPERIMENTAL EXAMPLE 22

A part of high-sensitive film for direct X-ray coated with silver iodobromide gelatin emulsion (containing 2 mol % of silver iodide) on both surface thereof was exposed and then processed continuously by use of the processing solution mentioned below and by the processing steps also mentioned below.

[Developing replenishing solution]

| Hydroquinone | 10 g |
|---|---|
| 1-Phenyl-3-pyrazolidone | 0.35 g |
| Sodium carbonate (monohydrate) | 25 g |
| Sodium hydroxide | 5 g |
| 5-methylbenzotriazole | 0.15 g |
| Glacial acetic acid | 15 g |
| Boric acid | 10 g |
| Potassium sulfite | 70 g |
| Glutaraldehyde (25% aqueous solution) | 20 g |
| Diethylenetriamine pentaacetic acid | 1.0 g |

Made up to 1 l with addition of water, adjusted to pH 10.40 with sulfuric acid and potassium hydroxide.

[Developing tank solution]

To 1 l of the developing replenishing solution, the following were added.

| Glacial acetic acid | 6.0 g |
|---|---|
| Potassium bromide | 4.0 g |

[Fixing replenishing solution and tank solution]

| Ammonium thiosulfate | 200 g |
|---|---|
| Sodium sulfite | 20 g |
| Acetic acid | 30 g |
| Pentasodium diethylenetriamine-pentaacetate | 1.0 g |

Made up to 1 l with addition of water, adjusted to pH 4.2 with acetic acid and ammonium.

[Water-substitutive stabilizing replenishing solution and tank solution]

| Diethylenetriaminepentaacetic acid | 1.0 g |
|---|---|
| 4-(-nitrobutyl)morpholine | 0.1 g |

Made up to 1 l with addition of water, adjusted to pH 6.5 with sulfuric acid and aqueous ammonium.

[Developing processing step]

| | Processing temperature | Processing time |
|---|---|---|
| Developing | 35° C. | 25 sec. |
| Fixing | 35° C. | 25 sec. |
| Water washing-substitutive stabilization | 30° C. | 20 sec. |
| Drying | 50° C. | |

An automatic processing machine was filled with the above developing tank solution, the fixing tank solution and the washing-substitutive stabilizing tank solution, and running test was performed while replenishing the developing replenishing solution in an amount of 450 ml, the fixing replenishing solution 900 ml and the water washing-substitutive stabilizing replenishing solution 600 ml per 1 m² of the light-sensitive material to be used for sample.

Each 5 l of X-ray waste solutions discharged in the above procesing was subjected to evaporation treatment shown in FIG. 5. The results are shown in Table 17.

TABLE 17

| pH value (waste solution) | Distillate (concentrated to 1/5) | | | |
|---|---|---|---|---|
| | Floatings | Color | $NH_4^+$ concentration (g/l) | $SO_3^{2-}$ concentration (g/) |
| 2.5 | large amount | white | 0 | 8.1 |

TABLE 17-continued

| | pH value (waste solution) | Distillate (concentrated to 1/5) | | | |
|---|---|---|---|---|---|
| | | Floatings | Color | $NH_4^+$ concentration (g/l) | $SO_3^{2-}$ concentration (g/l) |
| None additive | 4.5 | very slightly | colorless and transparent | 2 | 5.0 |
| | 6.5 | none | colorless and transparent | 10 | 2.5 |
| | 8.5 | none | colorless and transparent | 15 | 0 |
| | 10.5 | none | very thin yellowish | 25 | 0 |
| | 12.5 | none | yellow | 40 | 0 |
| aluminum polychloride (20 g/l) | 6.5 | none | colorless and transparent | 4 | 1.2 |
| Potassium carbonate (20 g/l) | 6.5 | none | colorless and transparent | 10 | 1.1 |
| Grains of limestone (20 g/l) | 6.5 | none | colorless and transparent | 10 | 1.0 |
| Calcium chloride (20 g/l) | 6.5 | none | colorless and transparent | 6 | 1.7 |
| Magnesium chloride (20 g/l | 6.5 | none | colorless and transparent | 6 | 1.6 |

As is apparent from Table 17, the distillate being colorless and transparent and good in a balance of concentration of sulfuric acid and ammonium can be obtained according to the present invention with respect to the waste solution of X-ray to exhibit excellent inhibiting effect of bad odor.

According to the present invention, amine odor and ammonia odor of the distillate can be inhibited even when the photographic processing waste solution is subjected to evaporation treatment, and also generation of $H_2S$ gas and S gas can be inhibited. For this reason, even when, for example, activated charcoal treatment, etc. may be provided as the secondary treatment, loading at said secondary treatment can be alleviated to a great extent, whereby the amount of the adsorbent consumed can be decreased and also cumbersomeness required for exchange of the adsorbent can be removed.

Also, according to the present invention, turbidity, etc. of the distillate can be also canceled, whereby not only there is no problem in disposal, but also reutilization, etc. become possible to provide a process and a device which is extremely high in general availability.

The present invention is also applicable for applications except for inhibition of bad odor as described above.

We claim:

1. A method for treating a photographic processing waste solution containing at least thiosulfate ions, comprising heating the photographic processing waste solution to evaporate the solvent and concentrate the solute in the remaining solution, and further comprising
   (i) introducing sulfite ions or a compound capable of releasing sulfite ions into the photographic processing waste solution at the time or before heating of the photographic processing waste solution.

2. The method for treating a photographic processing waste solution according to claim 1, wherein said photographic processing waste solution contains silver.

3. The method for treating a photographic processing waste solution according to claim 1, wherein the sulfite ions are permitted to exist in an amount of $5 \times 10^{-4}$ gram ion/l or more.

4. The method for treating a photographic processing waste solution according to claim 1, wherein the compound capable of releasing sulfite ions is used, and is at least one selected from the group consisting of
   $K_2SO_3$, $Na_2SO_3$, $(NH_4)_2SO_3$, $NaHSO_3$, $KHSO_3$, $Na_2S_2O_5$ and $K_2S_2O_5$;
   bisulfite addition compounds represented by the formula (I) or (II) shown below:

Formula (I)

wherein, $R_1$ represents a hydrogen atom or an alkyl group having 1 to 8 carbon atoms, $R_2$ represents an alkyl group having 1 to 8 carbon atoms and M represents an alkyl metal or an ammonium group,

Formula (II)

wherein, $R_3$ and $R_4$ each represent a hydrogen atom or an alkyl group having 1 to 8 carbon atoms, M represents an alkali metal or an ammonium group and n represents an integer of 0 to 6; and compounds represented by the following formula (A):

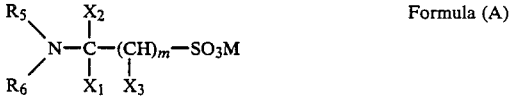

Formula (A)

wherein, $R_5$ and $R_6$ each represent a hydrogen atom, or an alkyl group which may have substituent, an acyl group which may have substituent or a carbamoyl group which may have substituent; and also $R_5$ and $R_6$ may be linked together to form a ring.

5. The method for treating a photographic processing waste solution according to claim 1, further comprising
   (ii) a contacting evaporated gas with a catalyst having a metal of the following (a) to (d) or a compound thereof carried thereon:
   (a) at least one metal selected form the group VIII elements consisting of iron, cobalt, nickel, ruthenium, rhodium, palladium, osmium, iridium and platinum,
   (b) copper,
   (c) zinc,
   (d) manganese.

6. The method for treating a photographic processing waste solution according to claim 5, wherein the metal is at least one selected from the group consisting of platinum, palladium, rhodium and iridium.

7. The method for treating a photographic processing waste solution according to claim 5, wherein the compound of the metal is at least one selected from the group consisting of oxides and chlorides of the metal, chloroauric acid, hexachloro-plantinum, rhodium chloride and nickel formate.

8. The method for treating a photographic processing waste solution according to claim 5, wherein the catalyst is carried by a carrier selected from the group consisting of $Al_2O_3$, $SiO_2$ and $ZrO_2$.

9. The method for treating a photographic processing waste solution according to claim 5, wherein a contact temperature of the catalyst is between 20° to 400° C.

10. The method for teaching a photographic waste solution according to claim 1 further comprising adding a water soluble polymer before or during the heating step.

11. The method for treating a photographic processing waste solution according to claim 10, wherein the water-soluble polymer has a polymerization degree of 30 to 10,000 and is contained in an amount of 0.01 to 300 g per liter of the photographic processing waste solution.

12. The method for treating a photographic processing waste solution according to claim 10, wherein the water-soluble polymer is a compound having OH groups or CO groups.

13. The method for treating a photographic processing waste solution according to claim 12, wherein the water-soluble polymer is a compound selected from the group consisting of polyvinyl pyrrolidone type compound, polyvinyl alcohol, gelatin, cellulose compound and isobutylene-maleic anhydride copolymer.

14. The method for treating a photographic waste solution according to claim 1, further comprising oxidizing thiosulfate ions in the waste solution by adding an oxidizing agent during or before the heating step.

15. The method for treating a photographic processing waste solution according to claim 14, wherein the oxidizing agent is at least on selected from the group consisting of peroxides, halogenic acids and metal oxides.

16. The method for treating a photographic processing waste solution according to claim 15, wherein the peroxides are selected from the group consisting of sodium persulfate, potassium persulfate, ammonium persulfate, hydrogen peroxides, sodium peroxomonosulfate, potassium peroxomonosulfate, ammonium peroxomonosulfate, potassium percarbonate, sodium percarbonate, ammonium perborate, potassium perborate, sodium perborate, magnesium perborate, benzoyl peroxide, peracetic acid, calcium peroxide, sodium peroxide, barium peroxide, manganese peroxide and lithium peroxide.

17. The method for treating a photographic processing waste solution according to claim 15, wherein the halogenic acids are selected from the group consisting of perchloric acid, potassium perchlorate, sodium perchlorate, barium perchlorate, magnesium perchlorate, potassium chlorate, sodium chlorate, potassium bromate, potassium iodate, potassium hydrogen iodate and sodium iodate.

18. The method for treating a photographic processing waste solution according to claim 15, wherein the metal oxides is at least one selected from the group consisting of $Fe_2O_3$, $Fe_3O_4$, FeO, ZnO, NiO, CuO, $MnO_2$, $KMnO_4$, $Cu_2O$, $Pb_3O_4$, SnO, $Bi_2O_3$, CoO, $Cr_2O_3$, $K_2Cr_2O_7$, $KCrO_4$, $Ce_2O_3$, $TiO_2$ and $ZrO_2$.

19. The method of treating a photographic waste solution according to claim 1 further comprising maintaining the pH of the photographic processing waste solution at 3.0 to 11.0 by adding a pH controlling agent thereto.

20. The method for treating a photographic processing waste solution according to claim 19, wherein pH of the photographic processing waste solution is maintained at 4.0 to 8.0.

21. The method for treating a photographic processing waste solution according to claim 19, wherein the method further comprises incorporating a compound selected from the group consisting of compounds represented by the following formulae (V) to (VIII) in the waste solution before heating or during heating:

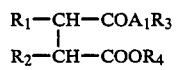

Formula (V)

wherein, one of $R_1$ and $R_2$ represents a hydrogen atom, and the other a group represented by the formula: $-SO_3M$, where M represents a hydrogen atom or a monovalent cation; $A_1$ represents an oxygen atom or a group represented by the formula: $-NR_5-$, where $R_5$ represents a hydrogen atom or an alkyl group having 1 to 8 carbon atoms; $R_3$ and $R_4$ each represent an alkyl group having 4 to 16 carbon atoms, with proviso that the alkyl group represented by $R_3$, $R_4$ or $R_5$ may be substituted with a fluorine atom,

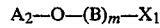

Formula (VI)

wherein, $A_2$ represents a monovalent organic group, B represents ethylene oxide or propylene oxide, m represents an integer of 4 to 50, $X_1$ represents a hydrogen atom, $SO_3Y$ or $PO_3Y_2$ and Y represents a hydrogen atom, an alkali metal atom or ammonium ion,

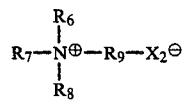

Formula (VII)

wherein, $R_6$, $R_7$, $R_8$ and $R_9$ each represent a hydrogen atom, an alkyl group or a phenyl group, with proviso that the total carbon atoms of $R_6$, $R_7$, $R_8$ and $R_9$ are 3 to 50 and $X_2^-$ represents an anion, Formula (VIII) 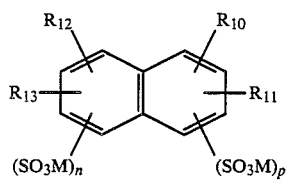
wherein, $R_{10}$, $R_{11}$, $R_{12}$ and $R_{13}$ each represent a hydrogen atom or an alkyl group; M is the same as in the formula (V) and n and p each represent an integer of 0 or 1 to 4, and values satisfying $1 \leq n+p \leq 8$.
* * * * *